(12) United States Patent
Azana et al.

(10) Patent No.: US 12,132,514 B2
(45) Date of Patent: Oct. 29, 2024

(54) METHOD AND SYSTEM FOR GENERATING THE SPECTROGRAM OF A SIGNAL

(71) Applicant: Institut national de la recherche scientifique, Quebec (CA)

(72) Inventors: Jose Azana, Montreal (CA); Benjamin Crockett, Montreal (CA); Connor Mckenzie Layton Rowe, Mont-Saint-Hilaire (CA)

(73) Assignee: Institut national de la recherche scientifique, Quebec (CA)

( * ) Notice: Subject to any disclaimer, the term of this patent is extended or adjusted under 35 U.S.C. 154(b) by 132 days.

(21) Appl. No.: 17/931,566

(22) Filed: Sep. 13, 2022

(65) Prior Publication Data

US 2024/0097782 A1    Mar. 21, 2024

(51) Int. Cl.
*H04B 10/079* (2013.01)
*G01J 3/28* (2006.01)
*H04B 10/61* (2013.01)

(52) U.S. Cl.
CPC ............ *H04B 10/0795* (2013.01); *G01J 3/28* (2013.01); *H04B 10/613* (2013.01); *H04B 10/612* (2013.01)

(58) Field of Classification Search
None
See application file for complete search history.

(56) References Cited

U.S. PATENT DOCUMENTS

2012/0062876 A1* 3/2012 Bennett ................ G01J 11/00
356/213
2020/0033189 A1* 1/2020 Wong ..................... G01J 1/00
2021/0226709 A1* 7/2021 Crockett ............. H04B 10/676

OTHER PUBLICATIONS

Salem, "Optical time lens based on four-wave mixing on a silicon chip", May 15, 2008, vol. 33, No. 10, Optics Letters, 0146-9592/08/101,047-3, pp. 1047-1049 (Year: 2008).*
R. Trebino, Frequency-Resolved Optical Gating: The Measurement of Ultrashort Laser Pulses (Springer US, 2000).
S.R. Konatham, R. Maram, L. Romero Cortés, J. H. Chang, L. Rusch, S. LaRochelle, H. Guillet de Chatellus, and J. Azaña, "Real-time gap-free dynamic waveform spectral analysis with nanosecond resolutions through analog signal processing," Nat. Commun. 11, (2020).
C. Dorrer and I. Kang, "Simultaneous temporal characterization of telecommunication optical pulses and modulators by use of spectrograms," Opt. Lett. 27, 1315 (2002).

(Continued)

*Primary Examiner* — Darren E Wolf
(74) *Attorney, Agent, or Firm* — FASKEN MARTINEAU DUMOULIN LLP; Dennis Haszko

(57) ABSTRACT

There is provided a system for generating a spectrogram signal representative of a spectrogram of an initial signal, the system comprising: a temporal phase modulator for receiving the initial signal and quadratically modulating a temporal phase of the initial signal in a periodic series of consecutive quadratic time lenses in order to obtain a temporal phase modulated signal; a spectral phase modulator for quadratically modulating a spectral phase of the temporal phase modulated signal to obtain a given signal representative of a series of consecutive spectra; and a sensor for detecting the given signal in a temporal domain in order to obtained a sensed signal and outputting the sensed signal, the sensed signal being representative of the spectrogram of the initial signal.

18 Claims, 23 Drawing Sheets

(56) References Cited

OTHER PUBLICATIONS

R. Trebino, R. Jafari, S. A. Akturk, P. Bowlan, Z. Guang, P. Zhu, E. Escoto, and G. Steinmeyer, "Highly reliable measurement of ultrashort laser pulses," J. Appl. Phys. 128, 171103 (2020).
Z. Jiang, D. E. Leaird, C. M. Long, S. A. Boppart, and A. M. Weiner, "Optical arbitrary waveform characterization using inear spectrograms," Opt. Commun. 283, 3017-3021 (2010).
T. Zahavy, A. Dikopoltsev, D. Moss, G. I. Haham, O. Cohen, S. Mannor, and M. Segev, "Deep learning reconstruction of ultrashort pulses," Optica 5, 666 (2018).
I. A. Walmsley and C. Dorrer, "Characterization of ultrashort electromagnetic pulses," Adv. Opt. Photon. 1, 308 (2009).
R. P. Scott, N. K. Fontaine, D. J. Geisler, and S. J. B. Yoo, "Frequency-to-Time-Assisted Interferometry for Full-Field Optical Waveform Measurements With Picosecond Resolution and Microsecond Record Lengths," IEEE Photonics J. 4, 748-758 (2012).
N. K. Fontaine, R. P. Scott, L. Zhou, F. M. Soares, J. P. Heritage, and S. J. B. Yoo, "Real-time full-field arbitrary optical waveform measurement," Nat. Photonics 4, 248-254 (2010).
C. Dorrer, B. de Beauvoir, C. Le Blanc, S. Ranc, J.-P. Rousseau, P. Rousseau, J.-P. Chambaret, and F. Salin, "Single- shot real-time characterization of chirped-pulse amplification systems by spectral phase interferometry for direct electric-field reconstruction," Opt. Lett. 24, 1644 (1999).
H. Duadi, T. Yaron, A. Klein, S. Meir, and M. Fridman, "Phase retrieval by an array of overlapping time-lenses," Opt. Lett. 44, 799 (2019).
J. Azaña, Y. Park, and F. Li, "Linear self-referenced complex-field characterization of fast optical signals using photonic differentiation," Opt. Commun. 284, 3772-3784 (2011).
B. H. Kolner, "Space-time duality and the theory of temporal imaging," IEEE J. Sel. Top. Quantum Electron. 30, 1951-1963 (1994).
M. A. Foster, R. Salem, D. F. Geraghty, A. C. Turner-Foster, M. Lipson, and A. L. Gaeta, "Silicon-chip-based ultrafast optical oscilloscope," Nature 456, 81-84 (2008).
K. Goda and B. Jalali, "Dispersive Fourier transformation for fast continuous single-shot measurements," Nat. Photonics 7, 102-112 (2013).
J. van Howe and C. Xu, "Ultrafast optical signal processing based upon space-time dualities," J. Light. Technol. 24, 2649-2662 (2006).
C. Zhang, J. Xu, P. C. Chui, and K. K. Y. Wong, "Parametric spectro-temporal analyzer (PASTA) for real-time optical spectrum observation," Sci Rep 3, 2064 (2013).
X. Xie, J. Li, F. Yin, K. Xu, and Y. Dai, "STFT Based on Bandwidth-Scaled Microwave Photonics," J. Light. Technol. 39, 1680-1687 (2021).
D. Ma, P. Zuo, and Y. Chen, "Time-frequency analysis of microwave signals based on stimulated Brillouin scattering," Optics Communications 516, 128228 (2022).
P. Zuo, D. Ma, and Y. Chen, "Short-Time Fourier Transform Based on Stimulated Brillouin Scattering," Journal of Lightwave Technology 40, 5052-5061 (2022).
B. Crockett, L. Romero Cortes, R. Maram, and J. Azana, "Optical signal denoising through temporal passive amplification," Optica 9, 130 (2022).
J. Azaña, "Real-time optical spectrum analysis based on the time-space duality in chirped fiber gratings," IEEE Journal of Quantum Electronics 36, 10 (2000).
N. K. Berger, B. Levit, S. Atkins, and B. Fischer, "Time-lens-based spectral analysis of optical pulses by electrooptic phase modulation," Electron. Lett. 36, 1644 (2000).
Karpinski et al., 2017. Bandwidth manipulation of quantum light by an electro-optic time lens. Nature Photonics 11, 53-57, www.nature.com/naturephotonics.
Yu et al., Nov. 16, 2022. Integrated femtosecond pulse generator on thin-film lithium niobate. Nature 612, 252-258, https://doi.org/10.1038/s41586-022-05345-1.

* cited by examiner

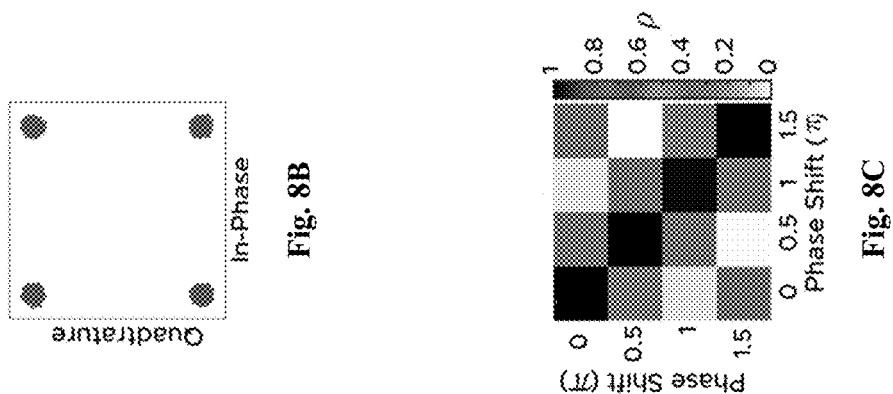
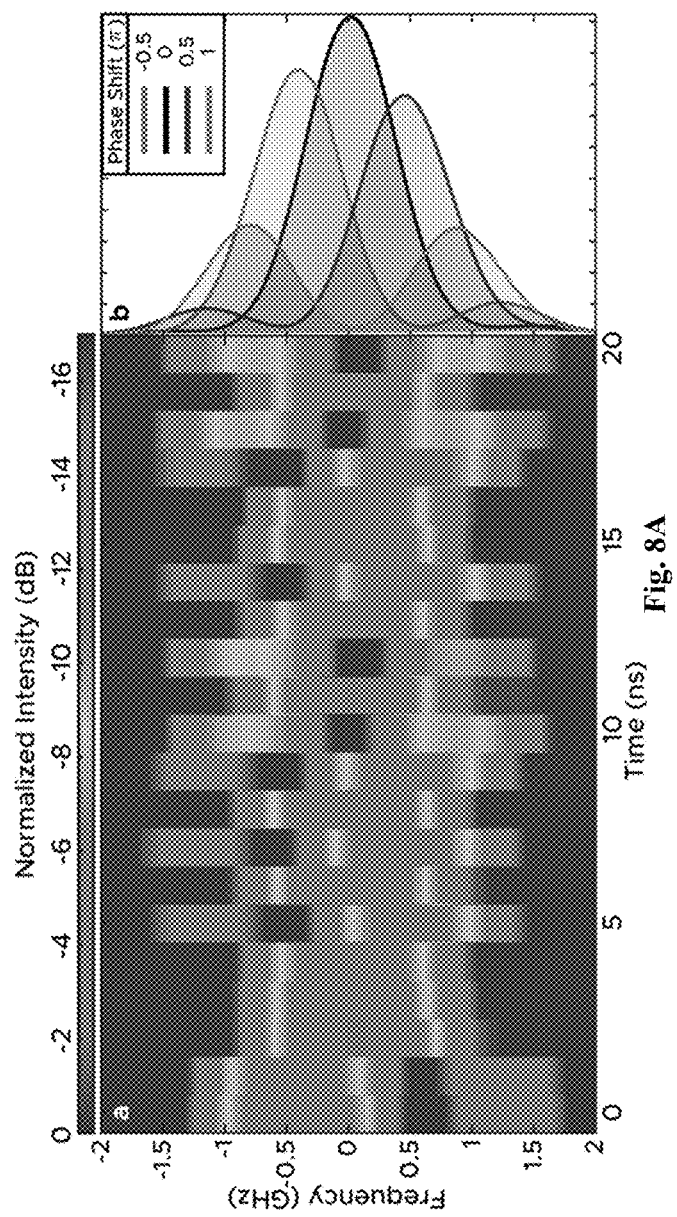
Fig. 8A
Fig. 8B
Fig. 8C

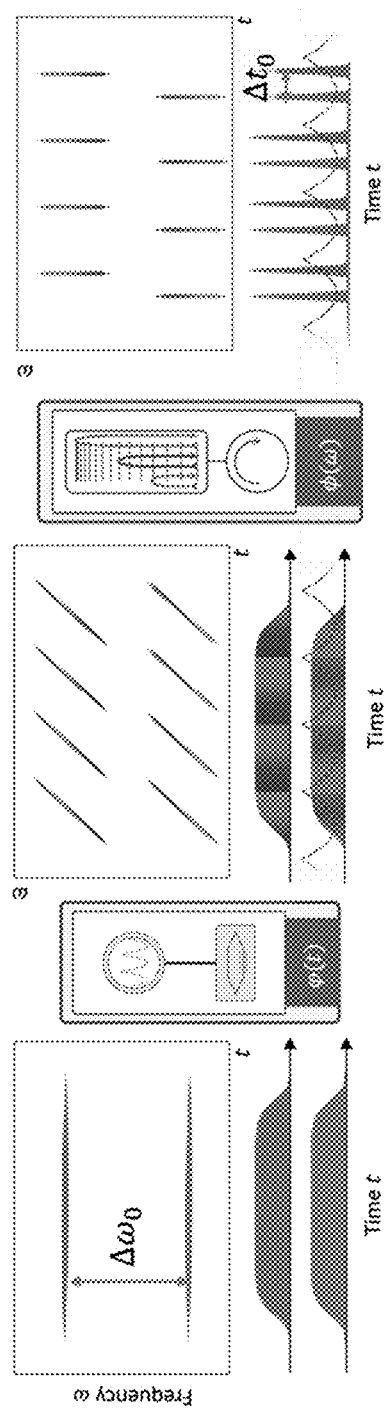

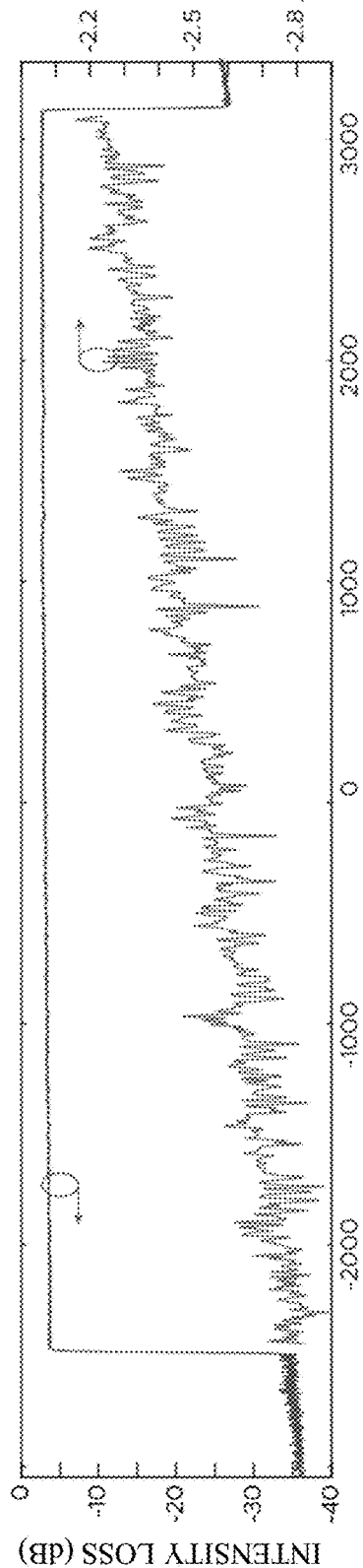
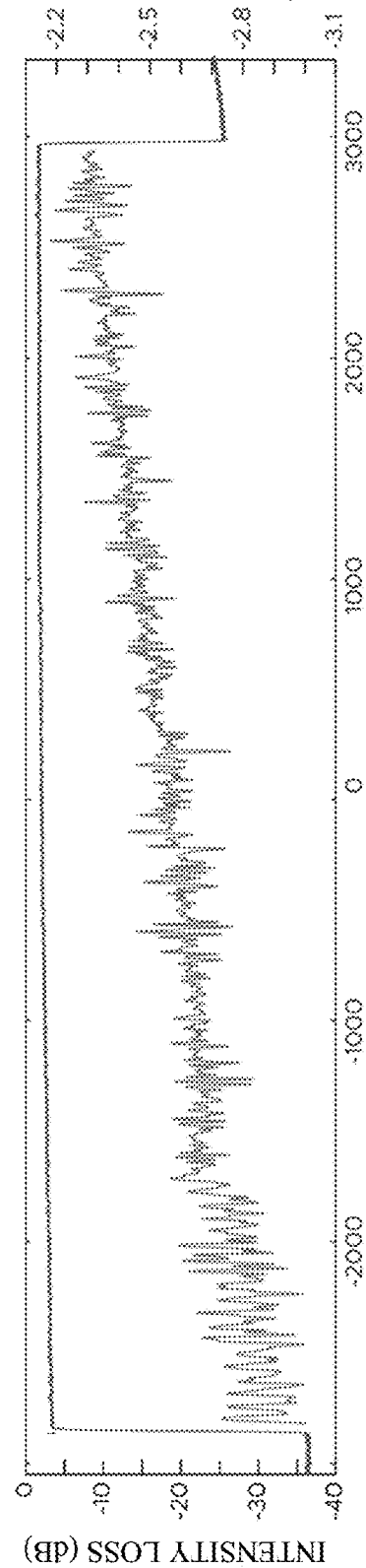
Fig. 11A
Fig. 11B

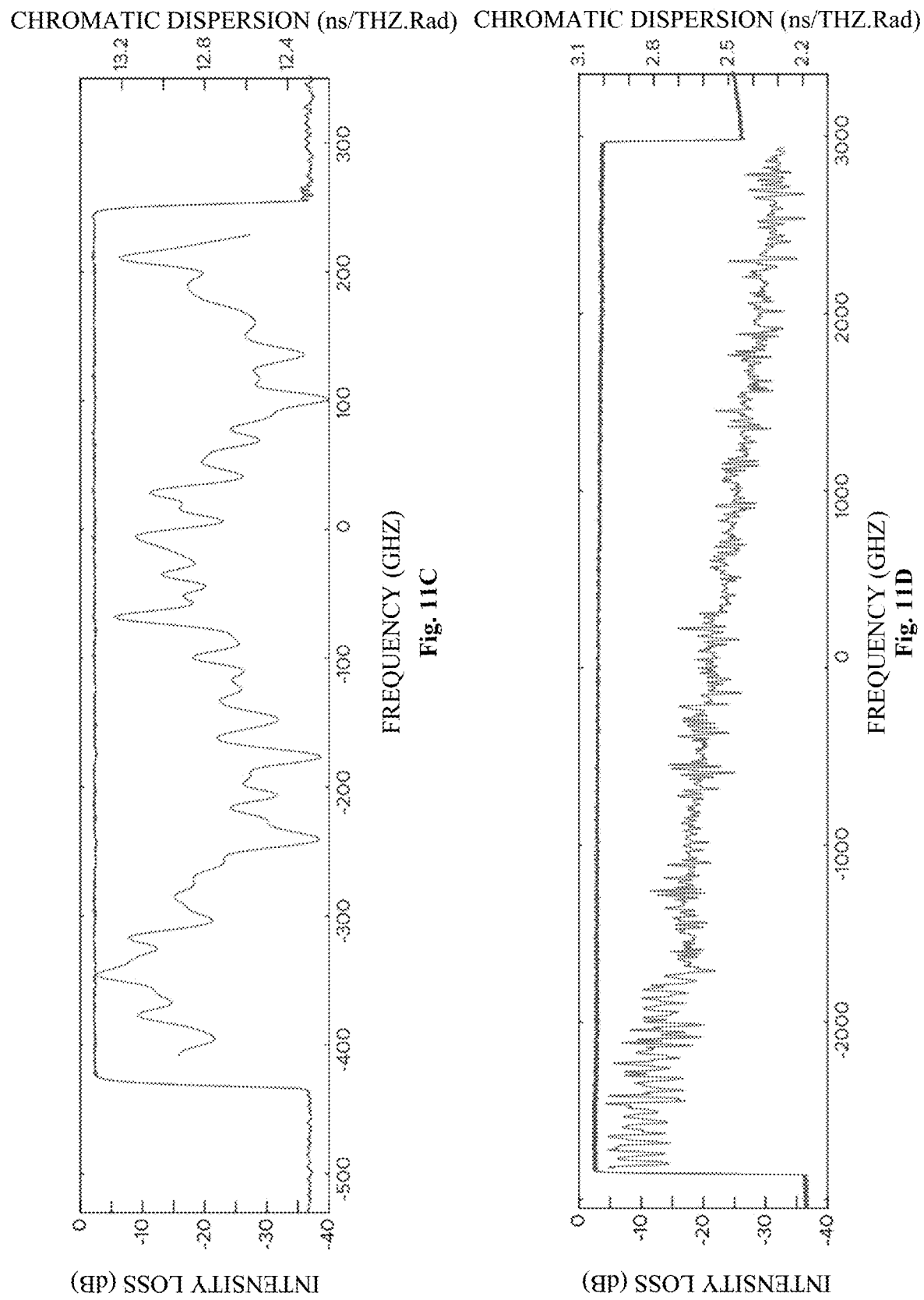

METHOD AND SYSTEM FOR GENERATING THE SPECTROGRAM OF A SIGNAL

FIELD

The present technology pertains to the field of signal processing, and more particularly to methods and systems for generating the spectrogram of a signal.

BACKGROUND

One of the most comprehensive representations of a waveform is achieved through time-frequency analysis, which depicts the evolving frequency components of a wave over time, e.g., through a spectrogram. Time-frequency representations are also well-known for allowing full-field characterization of a signal in terms of amplitude and phase, a task of paramount importance in waveform analysis. However, present methods rely either on digital or analogue wave processing and are either only suited for relatively narrowband waveforms (<GHz) of arbitrary duration, or of very large bandwidth but with significant constraints on the waveform duration (<1 ns).

Music is perhaps the most elegant and intuitive example of the foundational importance of time-frequency analysis. A musical score can be interpreted as a simple time-frequency representation, indicating which musical notes (or frequencies), are to be played at which times. Sophisticated algorithms are employed for studying or synthesizing musical pieces through their time-frequency representations. Although there exist many ways to perform time-frequency analysis, by far the most common approach is the spectrogram. Also known as the Short-Time Fourier Transform (STFT), the spectrogram is generated by computing the Fourier transform of consecutive temporally truncated (or windowed) sections of the input signal in a gapless fashion, consequently displaying the dynamic frequency content over time. Analyzing a waveform from a time-frequency perspective has been of central importance in various modern fields of science, and engineering, as an essential implementation tool as well as a subject of profound fundamental study.

Progress on time-frequency analysis has been closely related to the development of complex-field (or full-field) waveform characterization techniques for obtaining the magnitude and phase profiles of waveforms. Moreover, in most cases, the time-frequency representation itself provides the most intuitive depiction of the waveform structure and its complex-field properties. However, many optical waveforms encountered in practice are difficult to analyse; they regularly exhibit broad frequency bandwidths, from the GHz through to the THz range, as well as intricate phase patterns occurring in the picosecond range, all the while extending over durations thousands or millions of times longer, even extending over practically infinite durations, such that they must be continuously monitored in a gapless fashion. Such waveforms are typically characterized by the time-bandwidth product (TBP), defined as TBP=$\Delta t \Delta v$, where $\Delta t$ and $\Delta v$ are estimates of the temporal and spectral widths of the waveform. TBPs well above several thousands are routinely encountered in telecommunications, spectroscopy, radar/lidar and fundamental physics, for example. Despite all the previously developed strategies, it remains challenging to measure the complex field profile of some waveforms, such as sophisticated waveforms. Solutions, if existent, are even more limited when this information must be captured from only a single copy of the waveform of interest (i.e., in a single shot, without any gaps in acquisition), and possibly in a real-time fashion, as often required in most practical applications.

The most common approaches for obtaining the time-frequency representation of optical signals can be broadly categorized as digital signal processing (DSP) and temporal/spectral gating techniques. DSP techniques rely on implementing Fast Fourier Transform (FFT) algorithms on a digitized photodetected waveform, and as such they are limited to relatively modest bandwidths in the sub-GHz regime, with Fourier transform rates (FT/s) constrained to a few MHz at most, allowing for temporal resolutions only above the microsecond regime. Most critically, for complex-field recovery, the optical signal must be first captured by coherent detection, resulting in yet more stringent constraints on stability and operation bandwidth. Alternatively, optical gating techniques rely on high intensity nonlinear optics to time gate the signal of interest, which is then recorded with a spectrum analyser. These techniques enable characterization of broadband optical waveforms spanning multiple THz, with resolutions in the femtosecond regime. Unfortunately, their implementation is generally bulky and fragile, such that they have been restricted to specialized laboratories and controlled environments, with significant challenges for on-chip integration. Most importantly, these methods are severely limited regarding the maximum temporal duration of the waveforms that can be analysed, typically below 100 ps, resulting in a reported maximum TBP below 4,500 for single-shot operation.

Therefore, there is a need for an improved method and system for generating a spectrogram of a signal.

SUMMARY

According to a first broad aspect, there is provided a system for generating a spectrogram signal representative of a spectrogram of an initial signal, the system comprising: a temporal phase modulator for receiving the initial signal and quadratically modulating a temporal phase of the initial signal in a periodic series of consecutive quadratic time lenses in order to obtain a temporal phase modulated signal; a spectral phase modulator for quadratically modulating a spectral phase of the temporal phase modulated signal to obtain a given signal representative of a series of consecutive spectra; and a sensor for detecting the given signal in a temporal domain in order to obtained a sensed signal and outputting the sensed signal, the sensed signal being representative of the spectrogram of the initial signal.

In one embodiment, the initial signal is an optical signal.

In one embodiment, the temporal phase modulator comprises one of an electro-optic phase modulator, a cross-phase modulator (XPM) and a four wave mixer.

In one embodiment, the spectral phase modulator comprises one of an optical waveguide, a Linearly chirped fibre Bragg Gratings (LCFBG), a Bragg mirror, a pulse shaper, an integrated phase filter and a Talbot array illuminator.

In one embodiment, the temporal phase modulator is configured for quadratically modulating the temporal phase of the continuous signal in a series of consecutive discretized time lenses.

In one embodiment, the temporal phase modulator comprises a first Talbot array illuminator.

In one embodiment, the spectral phase modulator comprises one of an optical waveguide, a Linearly chirped fibre Bragg Gratings (LCFBG), a Bragg mirror, a pulse shaper, an integrated phase filter and a second Talbot array illuminator.

In one embodiment, the system further comprises a processing unit for generating the spectrogram of the initial signal based on the sensed signal.

In one embodiment, the initial signal comprises one of an acoustic signal, a plasmonic signal, a quantum wave signal, a microwave signal and an X-ray signal.

In one embodiment, a temporal modulation applied by the temporal phase modulator corresponds to a first approximation of a quadratic temporal modulation; and/or a spectral modulation applied by the spectral phase modulator corresponds to a second approximation of a quadratic phase modulation.

According to another broad aspect, there is provided a method for generating a spectrogram signal representative of a spectrogram of an initial signal, the system comprising: receiving the initial signal and quadratically modulating a temporal phase of the initial signal in a periodic series of consecutive quadratic time lenses, thereby obtaining a temporal phase modulated signal; quadratically modulating a spectral phase of the temporal phase modulated signal, thereby obtaining a given signal representative of a series of consecutive spectra; and detecting the given signal in a temporal domain, thereby obtaining a sensed signal, and outputting the sensed signal, the sensed signal being representative of the spectrogram of the initial signal.

In one embodiment, the initial signal is an optical signal.

In one embodiment, the step of quadratically modulating the temporal phase of the initial signal comprises propagating the initial signal into one of an electro-optic phase modulator, a cross-phase modulator (XPM) and a four wave mixer.

In one embodiment, the step of quadratically modulating the spectral phase of the comprises propagating the temporal phase modulated signal into one of an optical waveguide, a Linearly chirped fibre Bragg Gratings (LCFBG), a Bragg mirror, a pulse shaper, an integrated phase filter and a Talbot array illuminator.

In one embodiment, the step of quadratically modulating the temporal phase of the initial signal comprises quadratically modulating the temporal phase of the continuous signal in a series of consecutive discretized time lenses.

In one embodiment, the step of quadratically modulating the temporal phase of the initial signal comprises propagating the initial signal into a first Talbot array illuminator.

In one embodiment, the step of quadratically modulating the spectral phase of the comprises propagating the temporal phase modulated signal into one of an optical waveguide, a Linearly chirped fibre Bragg Gratings (LCFBG), a Bragg mirror, a pulse shaper, an integrated phase filter and a second Talbot array illuminator.

In one embodiment, the method further comprises generating the spectrogram of the initial signal based on the sensed signal.

In one embodiment, the initial signal comprises one of an acoustic signal, a plasmonic signal, a quantum wave signal, a microwave signal and an X-ray signal.

In one embodiment, a temporal modulation applied during said quadratically modulating the temporal phase of the initial signal corresponds to a first approximation of a quadratic temporal modulation; and/or a spectral modulation applied during said quadratically modulating a spectral phase of the temporal phase modulated signal corresponds to a second approximation of a quadratic phase modulation.

In the following, the term "quadratic" when applied to elements such as a modulator, a modulation, a lens, a time lens, or the like should be understood as quadratic, substantially quadratic, or any approximation of a quadratic shape such as a parabolic, sinusoidal, etc.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIGS. 8A-8F illustrate a single detector recovery of QAM telecommunication data signals, in accordance with an embodiment.

FIGS. 9A-9E illustrate a detailed time-lens spectrogram concept.

FIGS. 11A-11D illustrate exemplary spectral phase and amplitude response of LCFBGs.

DETAILED DESCRIPTION

Figure 1:
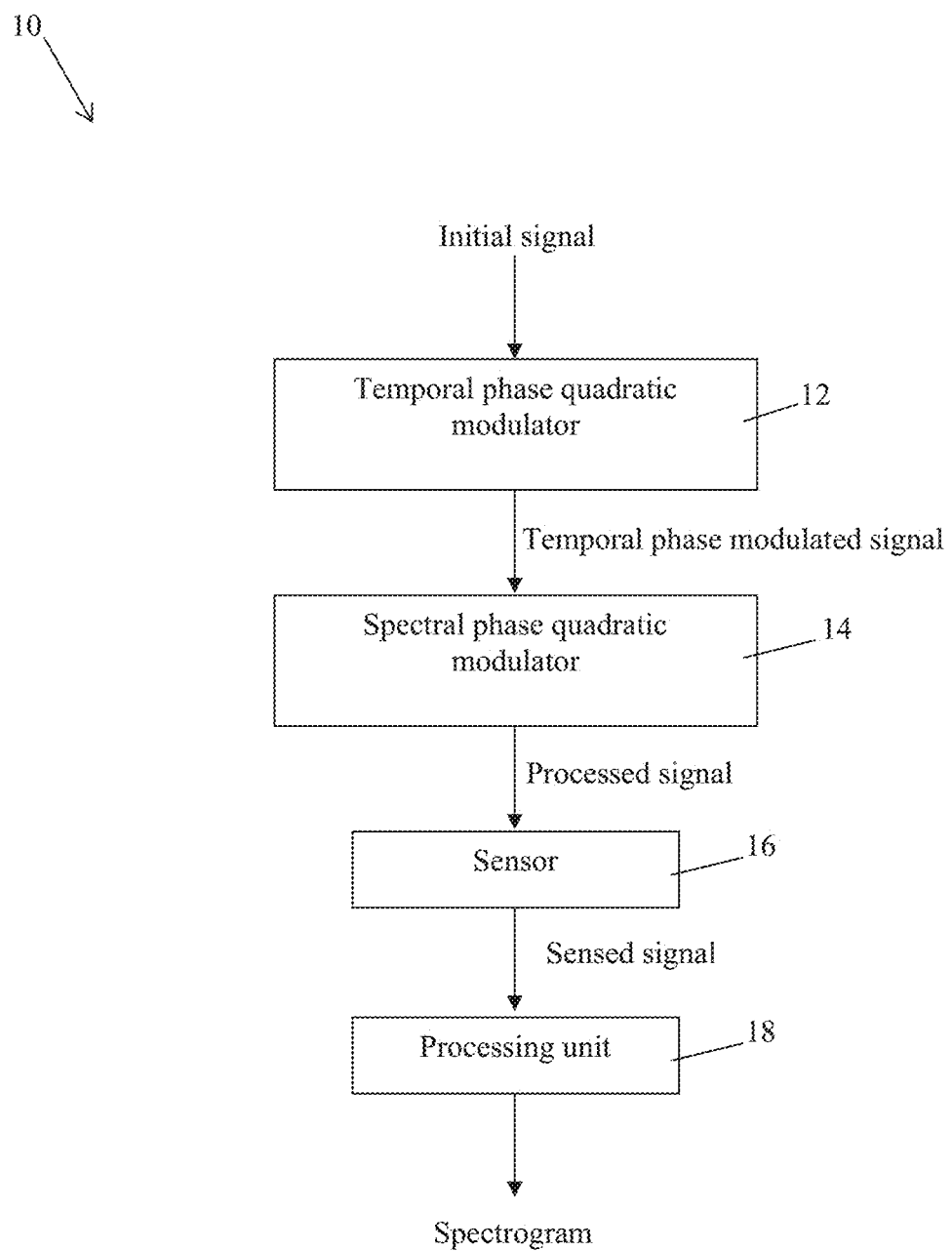
FIG. 1 is a block diagram illustrating a system for generating a spectrogram of a signal, in accordance with an embodiment.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Modifications and improvements to the above-described implementations of the present technology may become apparent to those skilled in the art. The foregoing description is intended to be exemplary rather than limiting.

The present method and system are directed to time-frequency analysis, and full characterization, of broadband complex-field waveforms with no fundamental limitation on their maximum temporal duration. The analysis is performed in a substantially real-time manner and with no gaps in the signal acquisition. The time-lens spectrogram (TLS) is based on two common linear transformations which preserve the input energy of the waveform, namely temporal phase modulation and chromatic dispersion, resulting in an inherently highly sensitive technique. The two common linear transformations comprise a series of two phase transformations that result in consecutive time mapped spectra (Fourier Transforms), leading to a simultaneous time and frequency representation of arbitrary waveforms. This results in a gapless Short Time Fourier Transform (STFT) that recovers the complex waveform in substantially real-time. Furthermore, the limitations on the speed and bandwidth of the resulting spectrogram are dependent on the speed and bandwidth of the transformation technologies used, but not on the bandwidth of the detection scheme, allowing for significant future development into unprecedented regimes. The first phase transformation is a temporal phase modulation, while the second manipulation is a spectral (frequency-domain) phase filtering or modulation stage.

FIG. 1 illustrates one embodiment of a system 10 for generating a spectrogram of an initial signal. The initial signal may be arbitrary, e.g., real, complex, periodic, aperiodic, etc.

The system 10 comprises a temporal phase modulator 12, a spectral phase modulator or filter 14, a sensor 16 and a processing unit 18.

The temporal phase quadratic modulator 12 is configured for receiving the initial signal and applying a quadratic modulation to the temporal phase of the initial signal to obtain a temporal phase modulated signal. More precisely, the temporal phase quadratic modulator 12 modulates the temporal phase $\varphi(t)$ of the initial signal in a periodic series of consecutive quadratic time-lenses following $\varphi(t)=C_L t^2/2$, where t is the time variable with respect to the centre of each time-lens aperture of duration $T_L$ and $C_L$ defines the strength of the time lens (and is often referred to as the phase parameter). Both $T_L$ and $C_L$ are decided by design. The product $T_L * C_L$ dictates the bandwidth of the modulation, i.e., the maximum bandwidth of the signal to be processed. The quadratic temporal modulation performed by the temporal phase modulator 12 causes each section of the initial signal to acquire a locally varying frequency chirp.

The temporal phase modulated signal propagates up to the spectral phase quadratic modulator 14 which applies a quadratic modulation to the spectral phase $\varphi(\omega)$ of temporal phase modulated signal following $\phi(\omega)=\ddot{\phi}\omega^2/2$, where $\ddot{\phi}$ is the Group Velocity Dispersion (GVD) coefficient, corresponding to the slope of the group delay as a function of the angular frequency variable $\omega$, relative to the signal's central frequency $\omega_0$. The person skilled in the art will understand that the quadratic modulation of the spectral phase is equivalent to a second-order dispersive propagation.

By imposing the TLS imaging condition $C_L \ddot{\phi}=1$, each segment contained within a time-lens aperture is focused into a temporal waveform depicting the frequency content of the initial signal within the aperture of the corresponding time lens, according to the frequency-to-time mapping law given by $2\pi v_t = t/\ddot{\phi}$, where $v_t$ is the frequency variable relative to the central frequency (or carrier) of the initial signal.

The processed signal, i.e., the signal outputted by the spectral phase quadratic modulator 14, is a temporal signal and is representative of the spectrogram of the initial signal since it contains consecutively time-mapped energy spectra each having a time duration equivalent to the time-length $T_L$. The person skilled in the art will understand that the processed signal may be seen as being representative of the "1D spectrogram" of the initial signal.

Referring back to FIG. 1, the processed signal outputted is detected by the sensor 16. The sensor 16 is configured for measuring in the time domain the amplitude of the processed signal to output a sensed temporal signal being a digital representation of the processed signal. Therefore, similarly to the processed signal, the sensed signal is representative of the "1D spectrogram" of the initial signal. The sensed signal is outputted by the sensor 16.

In one embodiment, the sensed signal is stored in memory for further access.

In same or another embodiment, such as in the illustrated embodiment in which the system 10 comprises a processing unit 18, the 2D spectrogram or 2D time-frequency energy representation of the initial signal is reconstructed based on the sensed signal. The 2D time-frequency energy representation of the initial signal is obtained from the one-dimensional temporal signal by vertically plotting each of the amplitude measurements of adjacent sections of time-length $T_L$, i.e., the sensed signal is divided into n sections each having a duration equal to $T_L$ and the sections are orderly positioned one on top of the other to obtain the 2D time-frequency energy representation of the initial signal, i.e., the spectrogram of the initial signal.

The person skilled in the art will understand that the temporal resolution of the performed spectrogram analysis is determined by the lens aperture $T_L$, which in turns translates into a frequency resolution of the order of $\delta v \approx 1/T_L$.

In one embodiment, the initial signal is an optical signal. In another embodiment, the initial signal is a wave signal other than an optical signal. For example, the initial signal may be an acoustic signal, a plasmonic signal, a quantum wave signal, a signal of any region of the electromagnetic spectrum, such as a microwave signal or an X-ray signal, or the like.

In an embodiment in which the initial signal is an optical signal, the temporal phase quadratic modulator 12 can comprise an electro-optic phase modulator, a cross-phase modulator (XPM), a four wave mixer, or the like. The spectral phase quadratic modulator 14 can comprise a waveguide through which dispersive propagation can be achieved, such as an optical fiber (e.g., a single mode fiber or a dispersion compensating fiber), a Linearly chirped fibre Bragg Gratings (LCFBG), a Bragg mirror, a pulse shaper, an integrated phase filter, or the like.

In an embodiment in which the temporal phase modulator 12 comprises an electro-optic phase modulator, the bandwidth of the input signal less than the bandwidth of the electro-optic modulation, i.e., less than $C_L T_L$.

While in the above description the temporal phase quadratic modulator 12 and the spectral phase quadratic modulator 14 are said to apply a quadratic modulation to a temporal phase and a spectral phase, respectively, it should be understood that the temporal phase quadratic modulator 12 and/or the spectral phase quadratic modulator 14 may be adapted to apply a pseudo-quadratic modulation or an approximated quadratic modulation. For example, the temporal phase quadratic modulator 12 and/or the spectral phase quadratic modulator 14 may apply a sinusoidal modulation or any other type of transformation that approximates a parabola.

Similarly, when the initial signal is an optical signal, the quadratic modulation performed by at least one of the temporal phase quadratic modulator 12 and the spectral phase quadratic modulator 14 may correspond to a discretized quadratic modulation. Such a discretized quadratic modulation may be obtained using a Talbot Array Illuminator (TAI). For example, the temporal phase quadratic modulator 12 may be a TAI while the spectral phase quadratic modulator 14 may be a component other than a TAI such as an optical fiber, an LCFBG, a Bragg mirror, a pulse shaper, or an integrated phase filter as described above. In another example, the spectral phase quadratic modulator 14 may be a TAI while the temporal phase quadratic modulator 12 comprises an electro-optic phase modulator, an XPM, or a four wave mixer, as described above. In a further example, both the temporal phase quadratic modulator 12 and the spectral phase quadratic modulator 14 each comprise a TAI. The person skilled in the art will understand that the specific equations for the phase modulations are akin to those used for TAI amplification, and consist of a periodically repeating discrete phase mask following discrete phase mask following $p/q\pi n^2$, where q corresponds to the number of analysis points of each spectrum, p is an integer coprime with q and n is an index that labels each phase bin from 1 to q.

In one embodiment, the use of TAIs allows implementing a discrete version of the phase functions in both the temporal and spectral domains which can be restricted to a maximum phase excursion of $2\eta$, thereby allowing for the simulated effect of a strong phase function. Thus, substitution of the temporal phase signal for the discrete counterpart allows for a large number of analysis points, whereas the use of discrete phase filters can enable on-chip integration of the system 10.

In an embodiment in which a TAI is used, the bandwidth of the initial is less than $1/t_s$, where is corresponds to the duration of a single phase step of a TAI phase, as known in the art.

In one embodiment, the processing unit 18 is omitted so that no 2D spectrogram is generated. In this case, the 1D spectrogram corresponding to the sensed signal may be used for analysis. For example, such a 1D spectrogram may be used to decode telecommunication wavelength division multiplexed (WDM) signals. Typically, to detect WDM signals, a demultiplexer and multiple detectors are required. For example, for five channels, five detectors are usually required. While using the present system 10, a single detector could be used for detecting all WDM signals since the frequency of each channel will correspond to a different temporal location within the sensed signal.

In an embodiment in which the temporal and spectral modulators 12 and 14 are optical modulators and the signal for which the spectrogram is desired is not an optical signal, the system 10 further comprises a converter or transducer (not shown) for converting the non-optical signal into an optical signal, i.e. the above-described initial signal. For example, the signal for which a spectrogram is desired may be a microwave signal. In this case, the system 10 further comprises a converter configured for converting microwaves into light such as a quantum wavelength converter, an intensity converter or an IQ converter. The converter receives the microwave signal for which the spectrogram is desired and converts it into the optical initial signal, i.e., the above-described initial signal. For example, the optical signal generated by a CW laser may be modulated by the microwave signal an intensity or phase or IQ modulator.

In an embodiment in which the initial signal is not an optical signal, such as when the initial signal is an acoustic signal, a plasmonic signal, a quantum wave signal, a signal of any region of the electromagnetic spectrum, such as a microwave signal or an X-ray signal, or the like, it should be understood that the temporal phase modulator 12 is configured to quadratically modulate the temporal phase of a non-optical signal and the spectral phase modulator 14 is configured for quadratically modulate the spectral phase of a non-optical signal.

While in the illustrated embodiment, the temporal phase modulator 12 receives the initial signal and the spectral phase modulator 14 receives the temporal phase modulated signal outputted by the temporal phase modulator 12, it should be understood that the order of the two modulators 12 and 14 may be changed, i.e., the initial signal may be inputted into the spectral phase modulator 14 and the signal outputted by the spectral phase modulator 14 is inputted into the temporal phase modulator 12 of which the output is connected to the sensor 16. In this case, the person skilled in the art will understand that the output of the temporal phase modulator 16 would correspond to a signal containing a series of containing short inverse Fourier transform segments in the spectral domain, which may be seen as a 1D sonogram. The 1D sonogram could detected and measured using a single detector such as a spectrum analyser.

Figure 2:
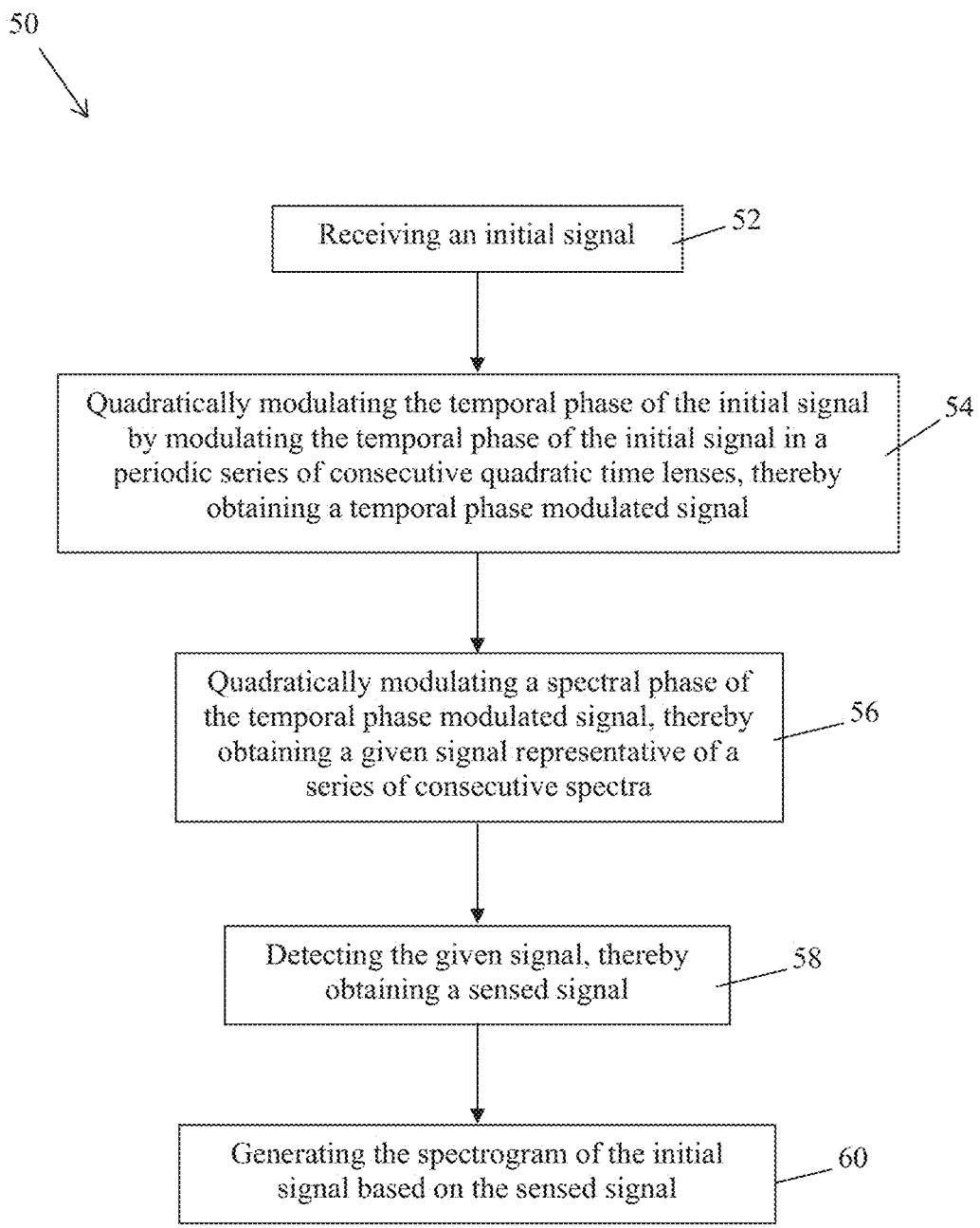
FIG. 2 is a flow chart illustrating a method for generating a spectrogram of a signal, in accordance with an embodiment.

FIG. 2 illustrates one embodiment of a method 50 for generating the spectrogram of an initial signal.

At step 52, an initial signal is received. As described above, the initial signal may be arbitrary, e.g., real, complex, periodic, aperiodic, etc.

At step 54, the temporal phase of the initial signal is quadratically modulated by modulating the temporal phase of the initial signal in a periodic series of consecutive quadratic time lenses following $\varphi(\omega)=C_L t^2/2$ (as described above), thereby obtaining a temporal phase modulated signal. It should be understood that any adequate method or device for quadratically modulating the temporal phase of the initial signal may be used.

At step 56, the spectral phase of the temporal phase modulated signal is quadratically modulated following $\phi(\omega)$ $=\ddot{\varphi}\omega^2/2$ and $C_L\ddot{\varphi}=1$, as described above. The resulting signal is representative of a series of consecutive spectra contained in the initial signal, i.e., representative of the spectrogram of the initial signal. It should be understood that any adequate method or device for quadratically modulating the spectral phase of a signal may be used.

At step 58, the signal outputted at step 56 is detected, i.e., its amplitude is measured in the time domain to obtain a digital signal.

In one embodiment, the digital signal is stored in memory for further processing/analysis.

In the same or another embodiment such as in the illustrated embodiment, the method 50 further comprises the reconstruction of a 2D spectrogram from the digital signal, as step 60. As described above, the 2D spectrogram is generated by vertically plotting each of the amplitude measurements of adjacent sections of time-length $T_L$. The 2D spectrogram may be stored in memory and/or provided for display on a display unit.

In one embodiment, the initial signal is an optical signal. In this case, any adequate method for quadratically modulate the temporal phase of an optical signal may be used at step 54. Similarly, any adequate method for quadratically modulate the spectral phase of an optical signal may be used at step 56.

In another embodiment, the initial signal is a signal other than an optical signal such as an acoustic signal, a plasmonic signal, a quantum wave signal, a signal of any region of the electromagnetic spectrum, such as a microwave signal or an X-ray signal, or the like. In one embodiment, any adequate method for quadratically modulate the temporal phase of the non-optical signal may be used at step 54. Similarly, any adequate method for quadratically modulate the spectral phase of the non-optical signal may be used at step 56. In another embodiment, the method 50 further comprises a step of converting the non-optical signal into an optical signal and optical modulation methods are used at steps 54 and 56. The spectrogram is then determined based on the converted optical signal.

It should be understood that the order of the steps of the method 50 is exemplary only. For example, the step 56 may be performed prior to step 54. As described above, the output of step 54, when performed after step 56, would be a 1D sonogram.

In at least some embodiments, the present method and system offer at least some of the following advantages. The present method and system are suitable for joint time-frequency analysis of waveforms or signals such as optical waveforms, generally comprising arbitrary amplitude and phase variations along the time domain. They offer a continuous acquisition which is suitable for infinitely long signals in time. They also offer a gapless acquisition with substantially no loss of ultrafast transients and a substantially real-time processing, i.e., the spectral information is available in substantially real-time. The present system and method offer an ultrafast processing which may be hundreds to thousands of times faster than digital signal processing, e.g., a processing up to 16 GFT/s. They provide a high temporal resolution, e.g., a resolution down to about 65 ps. They further provide a high operation bandwidth, e.g. bandwidths up to about 5 THz using the above-described wrapping feature of the spectrogram. They allow the retrieval of intensity and phase information using a single detector even for signals such as chirped complex pulses and complex-modulation data signals (QAM).

In the following there is presented experimental results for the generation of the spectrogram of an optical signal. Off-the-shelf fibre-optics telecommunication components were used to demonstrate record-breaking FT rates in the GHz range, up to $16\times10^9$ FT/s. Using the basic TLS implementation, ultrafast optical waveforms of arbitrary durations, with bandwidths up to 448 GHz were analysed. The analysis was adapted to measure in a single shot the spectrogram of sophisticated optical waveforms, with a bandwidth extending over 5 THz (40 nm) and a total temporal duration up to 159 ns, corresponding to a time-bandwidth product of 798,975. Such intricate signals, containing ultrafast features over such long time durations, remain usually elusive to present complex-field measurement methods.

Figure 3:
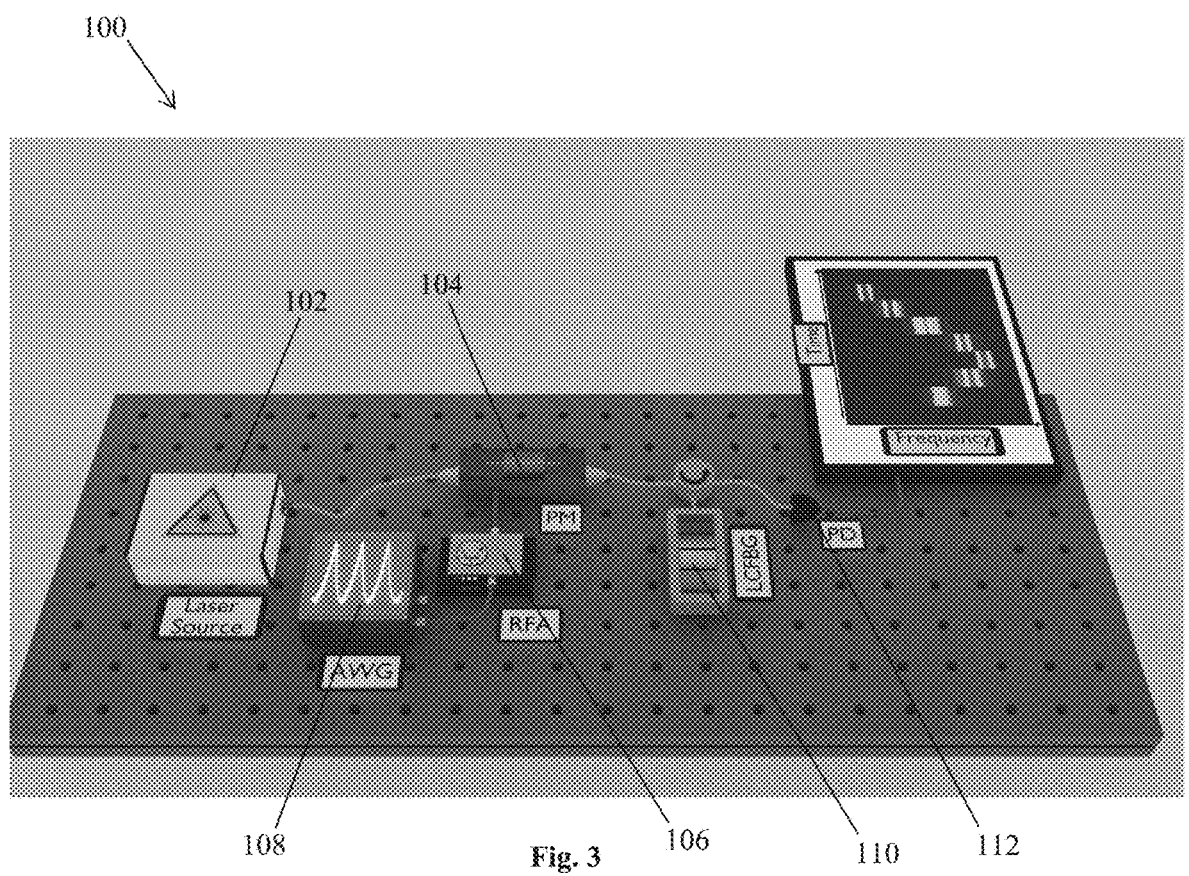
FIG. 3 illustrates an experimental time-lens spectrogram set-up configured for generating the spectrogram of an optical signal, in accordance with a first embodiment.
Figure 4:
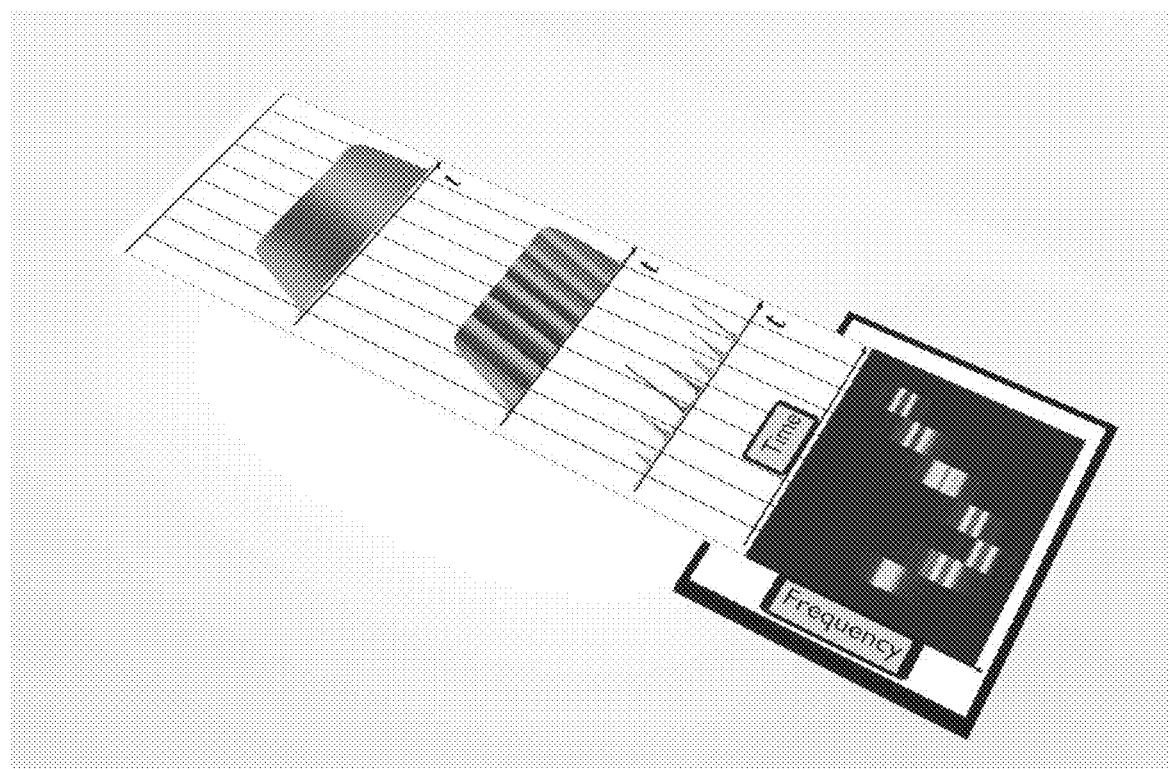
FIG. 4 illustrates changes in the temporal profile and instantaneous frequency (shown by the colour gradients) of an optical signal as it propagates through the time-lens spectrogram setup of FIG. 3.
Figure 5:
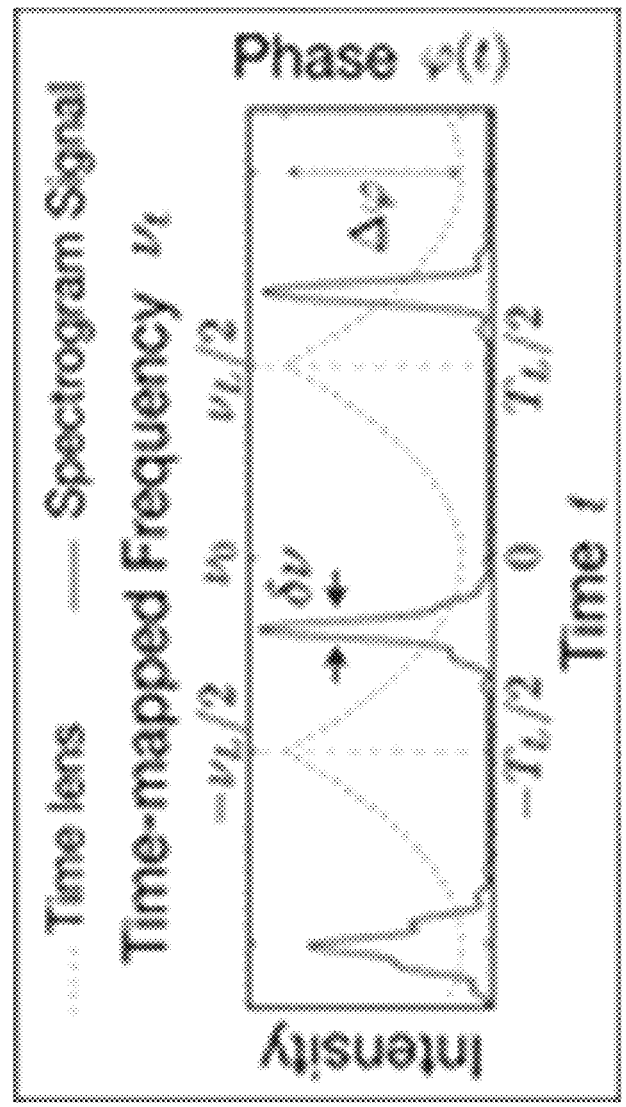
FIG. 5 illustrates the phase modulation profile $\varphi(t)$ of the optical signal implemented by the time-lens spectrogram set-up of FIG. 3.

FIG. 3 illustrates the experimental time-lens spectrogram set-up 100 to obtain the experimental results. The time domain representation of an arbitrary signal being analysed is shown in FIG. 4, relating the change in its temporal profile and instantaneous frequency (shown by the colour gradients) as it propagates through the time-lens spectrogram setup 100 shown in FIG. 3. The input signal under test (SUT) is generated by a generic laser source 102, and then temporally modulated with a series of consecutive quadratic phases using an electro-optic phase modulator (PM) 104 driven by a high-power RF amplifier (RFA) 106 and an electronic arbitrary waveform generator (AWG) 108, implementing a gapless time-lens array. FIG. 5, bottom axis & right vertical axis, shows the phase modulation profile $\varphi(t)$ implemented by the time-lens array. This creates a linear variation of the instantaneous frequency within each lens aperture. A device providing a specific amount of group velocity dispersion 110, such as an LCFBG, results in the time-mapped spectrogram as a series of pulse-like waveforms. As detailed in FIG. 5, the pulses are measured in the time-domain (bottom axis & left vertical axis), representing the spectral content within each time-lens through a frequency-to-time mapping law (top axis). The time-mapped spectrogram is detected by a single photodiode (PD) 112, and the adjacent lens sections are orthogonally plotted to display the 2D spectrogram.

1. Theory and Operation Principle

The spectrogram is simply defined as the squared magnitude of the STFT, which is implemented by sequentially truncating the SUT with a temporal analysis window of width $\delta t$ and Fourier transforming each truncated section to give the time-evolving spectra. This implies that the finest temporal duration to which a spectral event can be assigned to (i.e. the temporal resolution of the performed spectrogram) is determined by the width of the temporal analysis window. Through the fundamental uncertainty principle relation, the spectrogram possesses a fundamental trade-off in regards to its time resolution $\delta t$ and inversely related frequency resolution $\delta v \propto 1/\delta t$.

The present time-lens spectrogram concept can be understood as implementing the STFT of a given waveform directly in the analogue wave domain (i.e., before detection) using adjacent rectangular temporal analysis windows. The principle behind the TLS concept is illustrated in FIG. 4 for a complex-field optical signal, generated by a generic laser source such as source 102. As further detailed in Annex 1 below, the first step of the TLS consists of modulating the temporal phase $\varphi(t)$ of the SUT in a periodic series of consecutive quadratic time-lenses following $\varphi(t)=C_Lt^2/2$, where t is the time variable with respect to the centre of each time-lens aperture of duration $T_L$. This temporal modulation causes each section of the SUT to acquire a locally varying frequency chirp, as shown by the series of short colour gradients in the second plot in FIG. 4. The electro-optic phase modulator (PM) 104 driven by an electronic arbitrary waveform generator (AWG) 108 in which the time-lens array specifications can be easily programmed is used. This is then followed by a second-order dispersive propagation providing a quadratic spectral phase $\phi(\omega)=\ddot\phi\omega^2/2$, where $\ddot\phi$ is the Group Velocity Dispersion (GVD) coefficient, corresponding to the slope of the group delay as a function of the angular frequency variable $\omega$, relative to the signal's central frequency $\omega_0$. For this purpose, either a single-mode optical fibre or a linearly-chirped fibre Bragg grating (LCFBG) is used to obtain the desired amount of dispersion. By imposing the TLS imaging condition $C_L\ddot\phi=1$, each segment contained within a time-lens aperture is focused into a temporal waveform depicting the frequency content of the SUT within the aperture of the corresponding time lens, according to the frequency-to-time mapping law given by $2\pi\nu_t=t/\ddot\phi$, where $\nu_t$ is the frequency variable relative to the central frequency (or carrier) of the SUT, as shown in FIG. 5. The consecutively time-mapped energy spectra can then be captured directly in the time domain using a single photodetection device. The two-dimensional (2D) time-frequency energy representation is obtained from the one-dimensional temporal signal by vertically plotting each of the photodetected intensity measurements of adjacent sections of time-length $T_L$. The temporal resolution of the performed spectrogram analysis is then determined by the lens aperture $T_L$, which in turns translates into a frequency resolution of the order of $\delta\nu\approx1/T_L$.

In one embodiment, to ensure that the consecutively measured spectra are time mapped without interference within each time-lens, each spectrum is mapped over a duration shorter than the lens aperture, $T_L$. This implies that the SUT bandwidth must not exceed the bandwidth of the time-lens process (frequency excursion of the lens frequency chirp over the lens temporal aperture), i.e., $2\pi\Delta\nu_L=|C_L|T_L$. Thus, the time-lens bandwidth represents the only limitation to the maximum instantaneous bandwidth that can be analysed with this scheme, not the photodetection bandwidth. Moreover, as further demonstrated below, the technique can be adapted to analyse signals that have bandwidths much larger than the time-lens bandwidth, under certain conditions. In at least some embodiments, an important parameter relating the bandwidth and frequency resolution is the number of analysis points per spectral window, estimated as $\eta\approx\Delta\nu_L/\delta\nu$. Thus, to capture the spectrogram signal with optimal frequency resolution requires the detection of pulses along the temporal domain with a width of approximately $T_L/\eta\approx1/\Delta\nu_L$, i.e., of the order of the fastest time feature of the SUT (see also Methods and Annex 1 below). Hence, a limited detection bandwidth will sacrifice frequency resolution in the performed spectrogram analysis, but it will not affect the maximum operation bandwidth.

2 Results 2.1 Basic Demonstrations

The spectrogram analysis of complex-field, broadband optical pulses is carried out with specifically tailored frequency chirp structures. The technique is then extended to ultra-broadband waveforms with bandwidths in the THz regime to demonstrate precise and accurate complex-field recovery of extremely sophisticated waveforms. In a first set of experiments, the optical signal is generated by a stabilized frequency comb, filtered to a full (10-dB) bandwidth of 39 GHz, which is split into two separate optical paths. The first path propagates through an LCFBG providing a second-order dispersion $\ddot\phi_1\approx12{,}758$ ps$^2$, while the second path contains a dispersion of $\ddot\phi_2\approx-5{,}082$ ps$^2$. The paths are then recombined such that the pulses barely overlap in time (see FIGS. 10A-10C for a detailed schematic of the setup and FIGS. 11A-11D for a detailed characterization of the LCFBGs). Since the combined dispersed pulse extend over a duration equal to the repetition period (i.e., 4 ns), the SUT corresponds to a series of broadband up- and down-chirped waveforms extending over essentially infinite duration. The TLS system is designed for an analysis rate of $5\times10^9$ FT/s, with $\eta\approx11.3$ number of analysis points, and a real-time maximum analysis bandwidth of 56.4 GHz (see Methods section below). The spectrogram is detected using a 50-GHz photodiode (PD) connected to a 28-GHz real-time oscilloscope (RTO), and then reshaped into the corresponding 2D time-frequency representation shown in FIGS. 6A and 6B (see FIG. 12 for the photodetected signal). To verify the accuracy of the obtained spectrogram, the theoretically expected distributions are included as dashed overlays and the temporal and spectral marginals (or projections) of the spectrogram are compared with the temporal and spectral profiles of the input SUT measured with an RTO and optical spectrum analyser (OSA), respectively. It should be noted that the SUT bandwidth extends well above that of the detector and RTO, indicating that the TLS can detect signals with a larger bandwidth than the detection devices, as predicted above. The frequency resolution of the captured spectrogram is however slightly deteriorated with respect to the theoretical expected one, as observed by the slight mismatch between the measured time-frequency distribution and the overlays (see Methods section below).

Figure 6A:
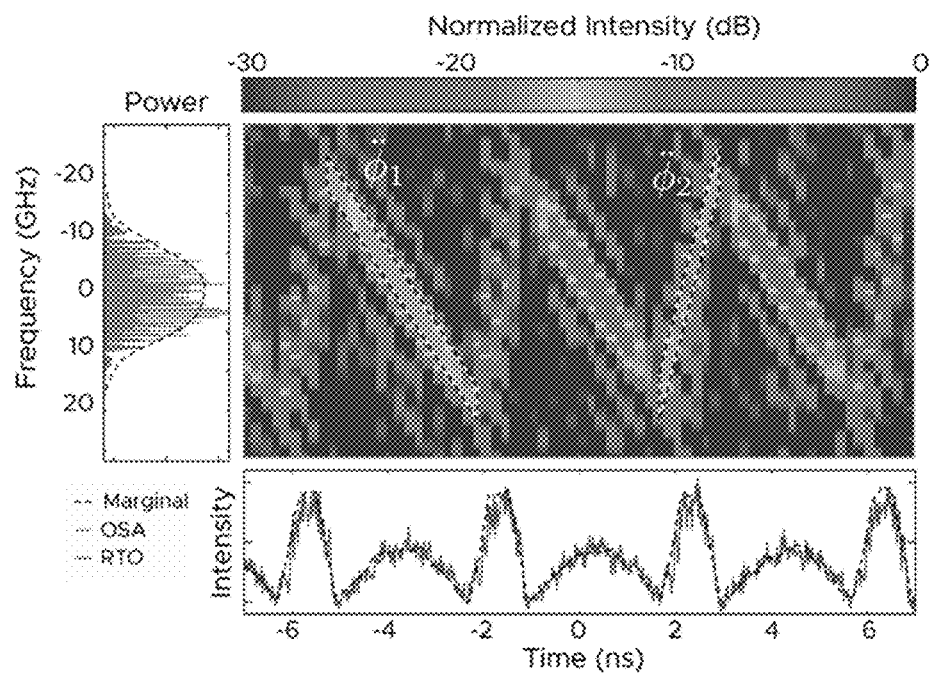
FIGS. 6A and 6B illustrate the time-frequency analysis of broadband optical waveforms, in accordance with an embodiment.

To demonstrate the high-bandwidth capabilities of the TLS technique, the RTO used for real-time visualization of the detected spectrogram in FIG. 6A is replaced with a 500-GHz bandwidth optical sampling oscilloscope (OSO). The scheme is redesigned such that the TLS performs with an operation bandwidth of ~448 GHz, a number of analysis points per spectrum $\eta\approx28$, and a time resolution of 62.5 ps, corresponding to an analysis rate of $16\times10^9$ FT/s (see Methods section below). Here, the SUT is adjusted to have a full bandwidth of 411 GHz, and the dispersive lines in the two paths are made to have the same magnitude but with opposite sign, i.e. $\ddot\phi_1\approx2.561$ and $\ddot\phi_2\approx-2{,}521$ s$^2$, resulting in a SUT that extends over ~10.3 ns, corresponding to a high TBP of 3,319.

A natural question that may arise concerns the effect of the edges of the implemented consecutive time lenses on the true gapless operation of the time-frequency analysis. A thorough experimental analysis was carried out and it was concluded that the TLS can perform accurate time-frequency analysis for events as short as $T_L/4$, regardless of the time of arrival of the event with respect to the time-lens array, proving true gapless operation (see Annex 2 below).

Figure 6B:
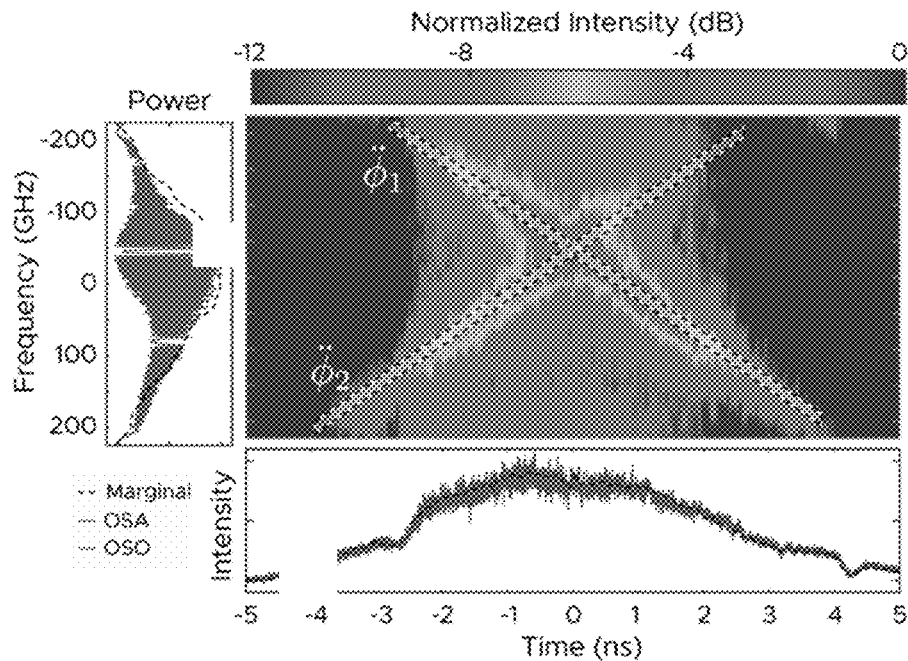

FIGS. 6A and 6B depict a time-frequency analysis of broadband optical waveforms. The SUT is composed of two closely spaced and periodically repeating chirped pulses with a 10-dB bandwidth of 39 GHz extending indefinitely in time. The spectrogram is captured in real-time using the TLS scheme with $T_L=200$ ps, corresponding to an analysis rate of $5\times10^9$ FT/s, and $\eta\approx11.3$ analysis points per spectrum. The theoretically expected chirp and frequency resolution is shown by the dashed overlays, representing a convolution between the frequency resolution and the frequency content within a lens, which depends on the chirp (see Methods section below). The marginals (projections) of the spectrogram are compared with the spectral trace of the SUT from an optical spectrum analyser (OSA) (shown in FIG. 6A) and the temporal trace of the SUT from a real-time oscilloscope (RTO) (shown in FIG. 6A), confirming the accuracy of the measurement. By employing an optical sampling oscilloscope (OSO), there is shown in FIG. 6B results for a TLS scheme with $T_L=62.5$ ps, corresponding to an analysis rate of 16×10⁹ FT/s and an operation bandwidth of 448 GHz, allowing for time-frequency analysis of a complex double-chirp optical waveform with a 10-dB bandwidth of 411 GHz, with the corresponding marginals shown in FIG. 6B.

2.2 Broadband Operation and Phase Recovery

In at least some embodiments, the operation bandwidth of the TLS can be extended much further than the nominal one defined above. The SUT is prepared as a short optical pulse with a full bandwidth of 5.02 THz and a phase variation is imposed on the SUT by propagating it through an LCFBG providing a total second-order dispersion $\ddot{\phi}_1 \approx -5,082$ ps² and a total third-order dispersion $\dddot{\phi}_1 \approx 30.2$ ps³. By extending over a total duration of 159 ns, the resulting optical waveform exhibits a TBP of 798,975. The TLS is designed with a total analysis bandwidth of 54.7 GHz, and a time resolution (lens aperture) of 468.75 ps. The photodetected spectrogram is captured in a single-shot and real-time manner using a 28-GHz RTO.

Figure 7A:
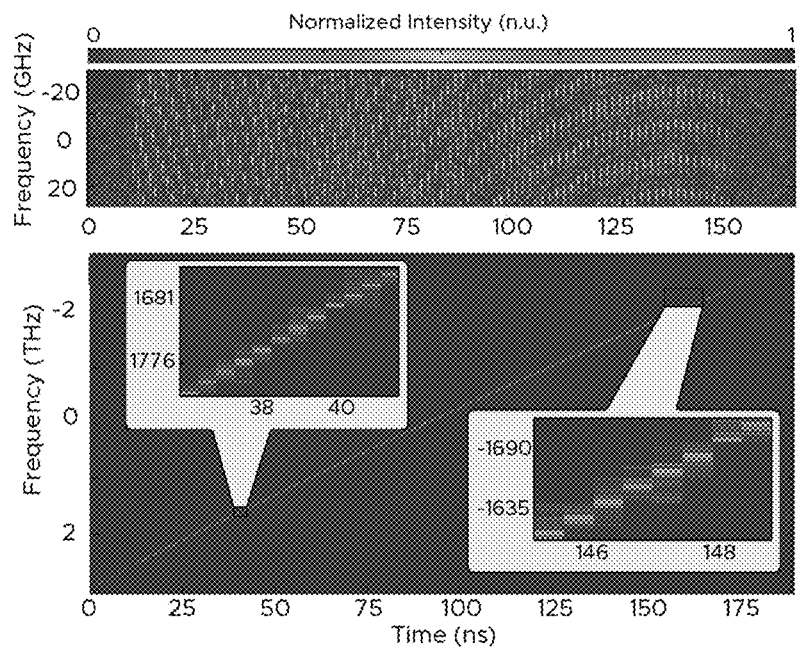
FIGS. 7A-7F illustrate the single-shot complex-field recovery of ultra-broadband optical waveforms, in accordance with an embodiment.
Figure 7B:
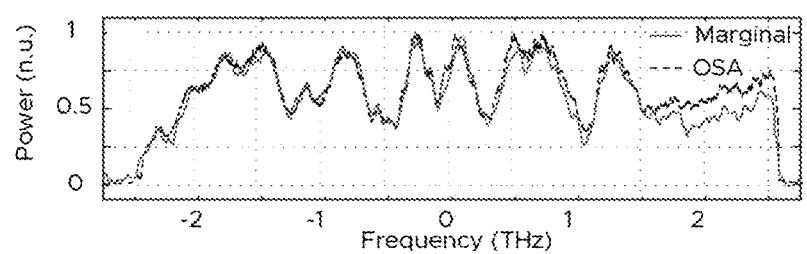
Figure 7C:
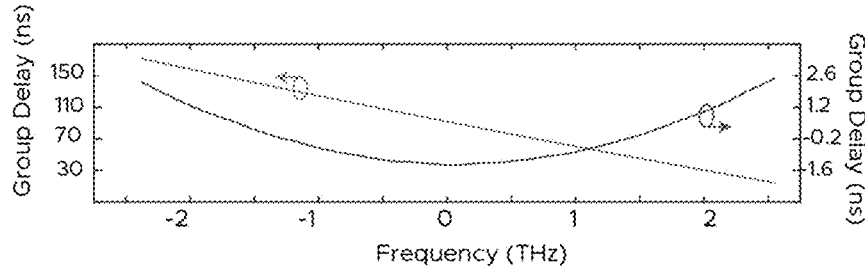
Figure 7D:
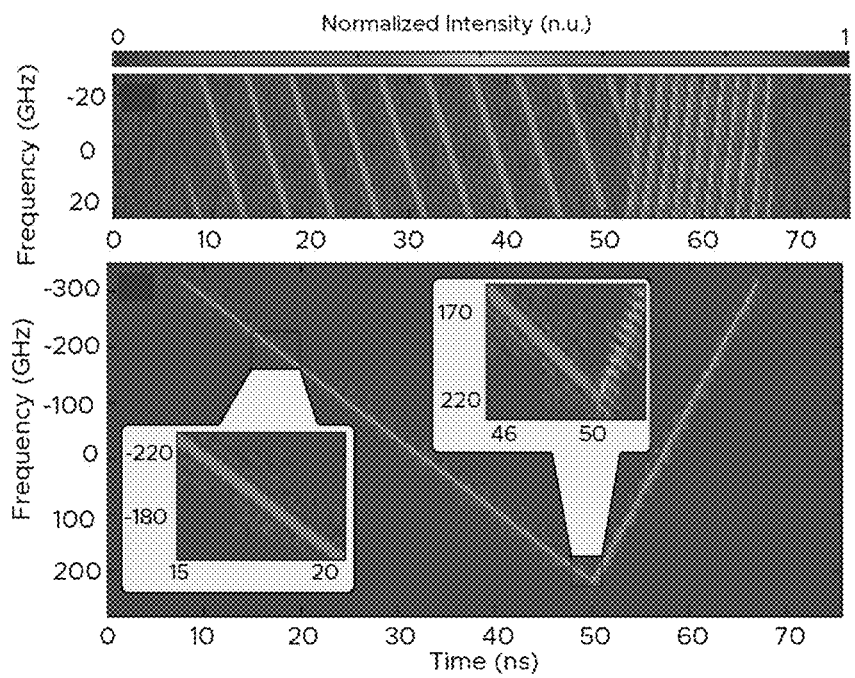
Figure 7E:
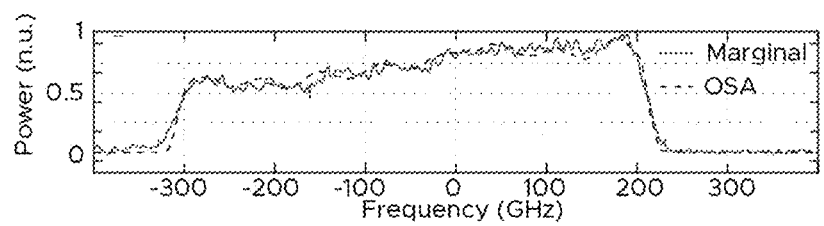
Figure 7F:
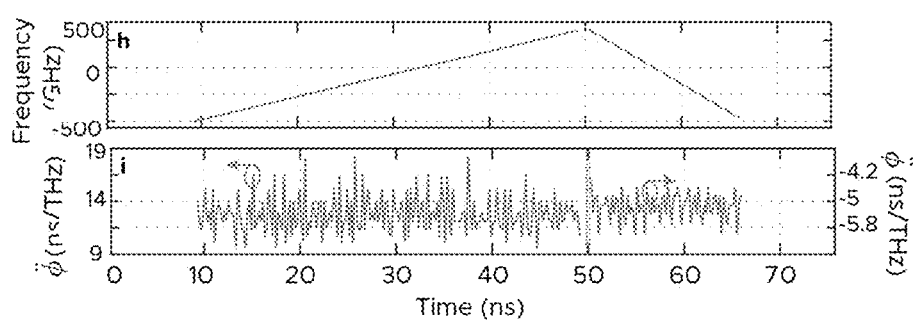

FIGS. 7A-7F depict a single-shot complex-field recovery of ultra-broadband optical waveforms. A 5.02 THz signal is chirped to extend over a duration of 159.4 ns, corresponding to an ultra-high time-bandwidth product of ~800,000. Since the bandwidth extends far beyond the time-lens bandwidth, $\Delta v_L$, it can be seen that the spectrogram wraps onto itself (see FIG. 7A). It is possible to unwrap the measured spectrogram trace with high fidelity, as shown by the insets in FIG. 7A. The marginal trace of the spectrum (from the recovered spectrogram) are compared with the SUT spectrum directly captured by an OSA, demonstrating that the performed spectrogram analysis enables an accurate recovery of the SUT spectrum as shown in FIG. 7B. d By projecting the temporal location of the spectrogram intensity peak versus the spectral axis, the group delay profile is recovered, which in turns allows to estimate the second-order $\ddot{\phi}_1 = -5,071$ ps² and third-order $\dddot{\phi}_1 = 31.03$ ps³ parameters, corresponding to the linear and quadratic slopes of the group delay versus frequency, respectively, as shown in FIG. 7C. As a second example, it is demonstrated in FIGS. 7D and 7E the recovery of a waveform that has a time-frequency profile with non-monotonic variations, using the same representations as for FIGS. 7A and 7B. h The waveform's instantaneous frequency vs time can now be recovered as shown in FIG. 7F, and from the inverse of this slope obtain the second-order dispersion parameters that the SUT travelled through during the respective temporal section as $\ddot{\phi}_1 = +5,078$ ps² and $\ddot{\phi}_2 = -12,778$ ps², respectively, can be recovered as shown in FIG. 7F.

As shown in FIG. 7A, when the SUT bandwidth exceeds the time-lens bandwidth $\Delta v_L$, the obtained time-frequency representation wraps onto itself. Using basic assumptions on the signal structure, it is possible to unambiguously unwrap the obtained representation, as in FIG. 7A (see Annex 3 for further details on the needed assumptions). The spectral marginal of the recovered spectrogram is obtained and it is confirmed that this is in excellent agreement with the OSA measured optical spectrum of the SUT. Furthermore, the complex-field information of the chirped waveform that is directly recovered from the measured spectrogram by performing a projection of the group delay versus frequency, shown by the orange trace in FIG. 7C, is evaluated. The obtained group delay profile is expanded to obtain a second-order dispersion of $\ddot{\phi}_1 = -5,071$ ps², corresponding to a percent error of 0.2% from the expected value. By subtracting this linear component from the group delay profile, a quadratic dependence, shown with the red trace, is obtained, from which a third order dispersion parameter of $\dddot{\phi}_1 = 31.03$ ps³ is obtained, representing a percent error of 2.8% compared to the expected value. It should be noted that the dispersion values estimated from the waveform phase recovery are compared to measurements of the involved LCFBG device parameters from a conventional (not real-time) optical interferometry method (see Methods section below) rather than a comparison with direct measurements of the SUT, as the inventors are not aware of any other way to measure signals this sophisticated, less so in a single shot manner.

The unwrapping technique can be employed for waveforms of arbitrary shapes, such as the double-chirp signal shown in FIG. 7D, with the corresponding spectrogram representation in FIG. 7D. The SUT in this case has a 10-dB bandwidth of ~554 GHz and is composed of two recombined optical pulses which travel through two separate LCFBGs with second-order dispersions of opposite sign, $\ddot{\phi}_1 \approx 12,758$ ps² and $\ddot{\phi}_2 \approx -5,082$ ps², respectively, similarly to the signal generated in FIG. 6A. The TLS settings are the same as those employed for the analysis in FIG. 6A as well. This results in a temporal waveform extending over a 10-dB temporal duration of 58.6 ns, corresponding to a TBP of 32,443. The complex-field information is extracted in this case by performing a projection of the instantaneous frequency vs time, shown in FIG. 7F. A simple numerical derivative yields the variation of the instantaneous frequency vs time. The inverse of this value thus corresponds to the second order dispersion parameter, as shown in FIG. 7F, and dispersion values of 12,778 ps² and −5,078 ps², corresponding to percent errors of 0.16% and 0.08% over the measured LCFBG dispersion values, respectively, are recovered.

It should be noted that the highly dispersive line employed in the SUT generation to stretch the broadband pulse in FIGS. 7A-7C enabled a straight-forward approach for the complex-field recovery. The inventors predict that the spectrogram concept could instead encompass the use of the dispersive line as a part of a processing module to enable the full characterization of sophisticated complex waveforms extending over very short time scales. Since dispersive propagation is a linear operation, it can subsequently be compensated for in the measured spectrogram to obtain the complex-field information of the undispersed waveform, following a similar principle demonstrated in earlier work. This would lead to resolvable temporal durations much smaller than a time-lens aperture. In the most general case, the complex-field description of a given waveform can be obtained from its 2D time-frequency representation using a variety of well-studied methods. An advantage of the TLS towards this aim is that we have a precise knowledge of the temporal window function used for the spectrogram analysis (a square window extending over a duration equal to the lens time aperture, $T_L$).

2.3. Complex Modulation Telecommunication Signal Decoding Using Time-Frequency Analysis Finally, it is demonstrated how the TLS can enable phase retrieval of a potentially infinitely long non-periodic signal with ultrafast phase variations in real-time using a single photodetector. In this proof-of-concept experiment optical telecommunication data signals are decoded using a well-established complex-field modulation format, namely, quadrature amplitude modulation (QAM) with 4 and 8 levels, QAM4 and QAM8, respectively. The evaluated signals have a data rate of 1 GBaud/s, and a length of $2^{14}$ symbols. The ~16 microsecond signal length corresponds to a TBP of ~164,800 and demonstrates again the ability for the TLS to operate on arbitrarily long signals in real-time. The simplicity of the TLS system significantly contrasts with current techniques for decoding QAM signals, which typically involve multiple detectors, a stable, phase-coherent local oscillator, and phase noise compensation through energy-consuming DSP engines.

Figure 8E:
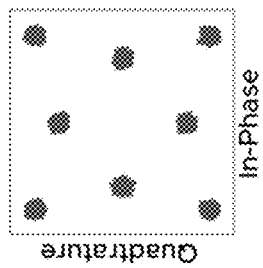
Figure 8F:
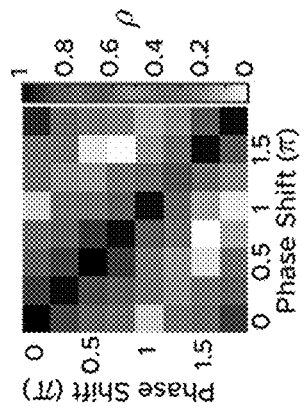
Figure 8D:
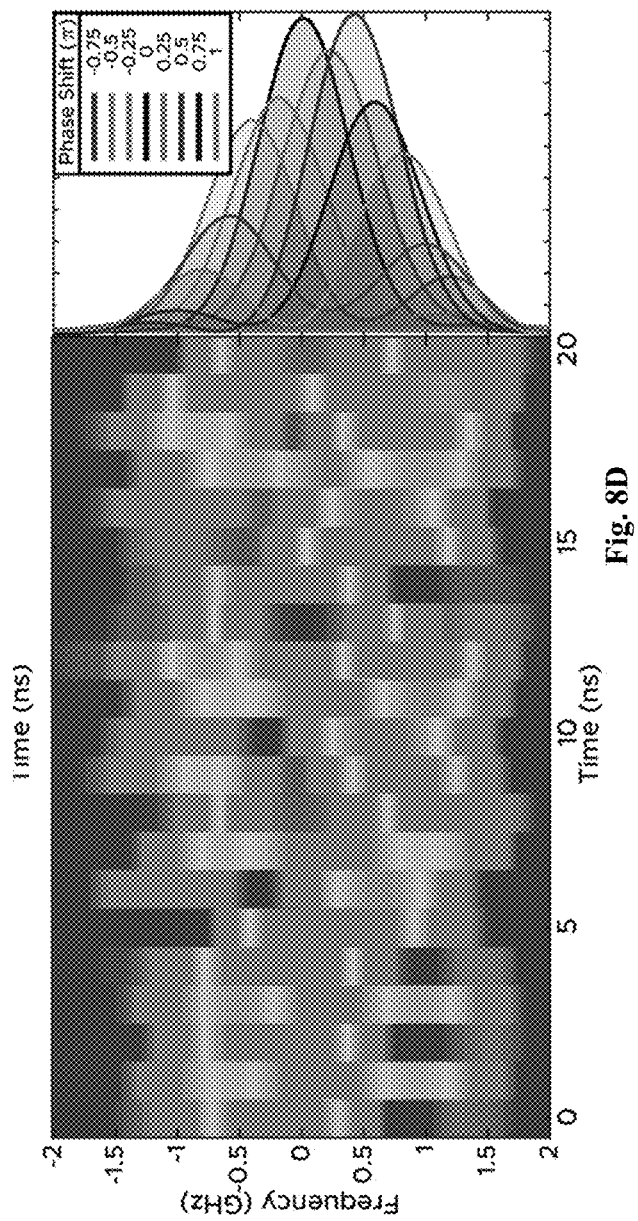

FIGS. 8A-8F depict a single Detector Recovery of QAM telecommunication data signals. FIG. 8A illustrates a spectrogram of a QAM4 data signal at 1 GBaud/s with time lenses centred on the bit transitions, enabling a fully self-referenced detection scheme by imaging the spectrum of each bit change. The frequency axis is zoomed from the full analysis bandwidth of 10.3 GHz down to 4 GHz. FIG. 8A illustrates a vertical slice of all unique phase transitions, shown on a linear scale. FIG. 8B illustrates a constellation diagram depicting the in-phase and quadrature components of the QAM4 pseudo random bit sequence (PRBS) from the electrical signals of the arbitrary waveform generator (AWG). FIG. 8C illustrates a similarity map comparing unique transitions to all other transitions by cross correlation. FIG. 8D-8F depict the same information for a QAM8 PRBS, where amplitude and phase transitions are involved.

For the decoding scheme employed here, the TLS system is chosen to have an operational bandwidth of 10.3 GHz and a time lens aperture of 1 ns, equal to the QAM symbol period, and aligned such that the TLS images the transition from one bit to the next to capture the corresponding phase and amplitude change. This effectively implements an entirely self-referenced differential detection, involving no interferometric or phase locking scheme. The captured spectrograms for QAM4 and QAM8 signals are shown in FIG. 8A and FIG. 8D respectively, where each vertical slice represents the Fourier spectrum of a bit transition. The fidelity of the spectrogram to discriminate these phase transitions can be shown by superimposing the spectra corresponding to all the possible transitions, creating an analogous "frequency-domain eye diagram" for the TLS (QAM4 FIG. 8A, QAM8 FIG. 8D). These traces correspond to the average spectra of multiple identical transitions from a pilot tone which scans iteratively through all bit pairs. For QAM4 there exists only 4 unique phase transitions (see FIG. 8B for the constellation diagram of bits from the electrical AWG (I)n-phase and (Q)uadrature signals for QAM4), while QAM8 comprises 8 unique transitions (FIG. 8E). The data signal is recovered by comparing the shapes of the spectrum of each transition via the cross-correlation coefficient ρ (see Methods). In FIG. 8C and FIG. 8F. it can visually be observed the efficacy of the system to discriminate bit transitions (where more similar shapes result in a higher value of ρ). The bit error rate (BER) between the generated and actual PRBS to be <6.1×10$^{-5}$ for QAM4 (i.e., containing no errors in the entire bit stream) is calculated. Applying the same method to QAM8, containing amplitude transitions as well as phase shifts, results in a recorded BER of 1.6×10$^{-2}$. It should be noted that the decoding scheme employed here represents a simple example of the many strategies that may be considered to achieve the desired complex-field recovery task for a given data signal from a measured spectrogram.

Methods

In this section, there is presented design considerations for the time-lens spectrogram. In at least some embodiments, an important design consideration when implementing the TLS is the number of analysis points per spectrum, given by the ratio of maximum analysis bandwidth (time-lens overall frequency excursion) and frequency resolution $\eta \approx \Delta v_L / \delta v$. The maximum analysis bandwidth is given by the overall frequency excursion of the time lens, namely, $2\pi \Delta v_L = |C_L| T_L = T_L / |\ddot{\phi}|$, where $C_L$ defines the lens frequency chirp parameter, $T_L$ is the time-lens aperture, and $\ddot{\phi}$ is the GVD of the dispersive line, and the frequency resolution is $\delta v \approx 1/T_L$. As a result, the number of analysis points can be estimated as $$\eta \approx \frac{1}{2\pi|\ddot{\phi}|} T_L^2 = \frac{4}{\pi} \Delta \varphi,$$

typically limited by the maximum temporal phase excursion $$\Delta \varphi = \frac{C_L}{8} T_L^2$$

achievable by the electro-optic time lens. It should be noted that the spectrogram analysis bandwidth is just limited by the time-lens bandwidth; thus, the detection bandwidth need not to cover the entire analysis bandwidth, though at the cost of frequency resolution. A detailed derivation of the design equations and trade-offs of the proposed TLS scheme is provided in the Supplementary Note 1 below.

Time-Lens Spectrogram Realization:

For all experiments except those from FIG. 7A the electrical temporal phase modulation function employed to drive the electro-optic phase modulator was generated by a 120 GSa/s AWG (Micram DAC5). For the results in FIG. 7A, the time-lens and SUT signal were generated by a 92 GSa/s AWG (Keysight M8196A). For the results shown in FIGS. 6A and 6B and 7A-7F, the RF signal was amplified by a high-power RF amplifier (RF Lambda, model RFLUPA01G31 GB) and fed to a 30-GHz low-Vπ electro-optic phase modulator (Eospace, Vπ=2.5 V). Using these components, the maximum attainable phase excursion is estimated to be ~7π, corresponding to a maximum number of analysis points approaching 30. The dispersive lines utilized for implementation of the experimental TLS schemes corresponding to each figure was tailored to the requirements of the concerned experiment, namely, dispersion compensating fibre (DCF) providing $\ddot{\phi} \approx 596$ ps$^2$ (equivalent to ~27 km SMF fibre, but of opposite sign) was used for the results in FIG. 6A and FIG. 7A, 1.17 km of SMF fibre providing $\ddot{\phi} = -26$ ps$^2$ for FIG. 6A, DFC providing $\ddot{\phi} \approx 1,320$ ps$^2$ (equivalent to ~60 km SMF) was used for the results shown in FIG. 7A, and two concatenated LCFBGs providing a total $\ddot{\phi} = 15,468$ ps$^2$, equivalent to 720 km of SMF fibre for the results in FIGS. 8A-8F. The time-lens aperture $T_L$ was adjusted for each measurement, effectively setting the operation bandwidth (time-lens bandwidth $\Delta v_L$), as follows: for FIG. 6A, $T_L$=200 ps, $\Delta v_L$=56.4 GHz; for FIG. 6A, $T_L$=62.5 ps, $\Delta v_L$=448 GHz; for FIG. 7A, $T_L$=468.75 ps, $\Delta v_L$=54.7 GHz; for FIG. 7A, $T_L$=200 ps, $T_L$=56.4 GHz; and for FIGS. 8A-8F, $T_L$=1 ns, $T_L$=10.3 GHz. For all experiments the signal was detected using a 50-GHz photodiode (Finisar XPDV21x0R™) connected to a 28-GHz real-time oscilloscope (Agilent DSO-X 92804A™), except FIG. 6A, where it was detected using a 500-GHz bandwidth optical sampling oscilloscope (EXFO PSO-100™). The PSO-100™ employs non-linear optical sampling to gate a periodic waveform with ultrashort optical pulses. It should be noted that there are several other strategies by which the temporal and spectral phase manipulations needed in the TLS could be implemented. The temporal phase modulation could be implemented through nonlinear effects, like cross-phase modulation (XPM) or four wave mixing (FWM). Dispersive propagation is also common to practically all wave domains, and various other techniques can be employed in optics, such as Bragg mirrors or discrete spectral phase filters.

Broadband Signal Generation:

The optical pulses in FIGS. 6A and 6B and 7A-7F were generated by a stabilized frequency comb (Menlo FC1500-250-WG™, 250 MHz repetition rate), filtered down to the required bandwidth by using an optical bandpass filter (Santec OTF-350™ for FIGS. 6A and 6B and Waveshaper 4000S™ by Finisar for FIGS. 7A-7F). For the results shown in FIG. 6A and FIGS. 7A-7F, the signal is decimated to a lower repetition rate using an electro-optic intensity modulator (Mach-Zehnder modulator) driven by the same AWG to avoid interference between neighbouring pulses. The SUT is then made to propagate through a prescribed amount of dispersion depending on the specific experiment to stretch the waveform over multiple lenses, as detailed above. For the results employing two separate optical paths to provide different amounts of dispersions (FIGS. 6A and 6B and 7A), the relative delay is adjusted using a variable tuneable delay line placed in one of the paths. The optical signal is amplified using an erbium doped fibre amplifier (EDFA) to compensate for the losses induced by the filtering and decimation stages. The phase responses of the gratings shown in FIGS. 11A-11D were measured by optical frequency domain reflectometry (OFDR) using an optical vector analyser (LUNA OVA 5000™)

Numerical Spectrogram Analysis:

The area delimiting the expected time-frequency distribution shown in FIGS. 6A and 6B was obtained by calculating the expected slope from each dispersive line, where the instantaneous frequency over time follows $\varphi'(t) = t/(2\pi\ddot{\varphi})$. The width of the overlays $\sigma$ across the frequencies (i.e. vertically) was modelled as a convolution between the spectral widths of the frequency resolution of the TLS, $\delta v \approx 1/T_L$, and the frequency distribution contained within a time lens $$\sigma_{\ddot{\varphi}_i} = \frac{T_L}{2\pi|\ddot{\varphi}_i|}$$

for the corresponding dispersive line $\ddot{\varphi}_i$, approximated by the equation $\sigma = \sqrt{\delta v^2 + \sigma_{\ddot{\varphi}_i}^2}$. For FIG. 6A, the frequency resolution is $\delta v \approx 5$ GHz and the frequency content within a lens for the propagation through $\ddot{\varphi}_1$ is $\sigma_{\ddot{\varphi}_1} \approx 2.46$ GHz, giving $\sigma \approx 5.57$ GHz, while for $\ddot{\varphi}_2$ it is a $\sigma_{\ddot{\varphi}_2} \approx 6.26$ GHz, giving $\sigma \approx 8.01$ GHz. For FIG. 6A, the frequency resolution is $\delta v \approx 16$ GHz, and the frequency content in a lens from each chirp is $\sigma_{\ddot{\varphi}_{1,2}} \approx 3.92$ GHz, such that the convolved resolution is $\sigma \approx 16.47$ GHz. These estimates of the expected frequency distribution closely agree with the measured distributions, as further described in FIG. 12.

QAM Signal Generation and Analysis:

The optical data telecommunication signals are generated by modulating a stable low-linewidth CW laser (Santec TLS 710™) using an IQ modulator (Covega Mach-10 086™). The electrical IQ signal is generated by a 12 GSa/s AWG (Tektronix AWG7133C™), such that each bit is oversampled by a factor of 12. The analysis of the measured spectrogram, including complex-field signal recovery, was done offline but it could be implemented in real-time and conceivably using photonics approaches. For the present analysis, the detected signal is linearly interpolated and then smoothed with a weight of 5% of the total points in each vertical slice so that the signal can easily be split into time-slots of the duration of the time-lens aperture and reshaped into the 2D spectrogram images shown in FIG. 8A and FIG. 8D. The electrical signals of the I channel, Q channel, and the intensity of the optical signal were recorded to confirm the expected bit pattern for the pilot sequence and used to create the constellation diagrams in FIGS. 8A-8F. Each transition in the spectrogram of the pilot sequence was then assigned the proper amplitude and phase shift by comparing to a set of known sequences, and the decision was made depending on which maximized the cross-correlation coefficient. The phase transitions along with the average of all the corresponding shapes are shown in FIG. 8A for QAM4 and FIG. 8D for QAM8. In the following definition of the cross-correlation coefficient $\rho_{i,j}$, each measured incoming transition spectrum $\gamma_j(\tau)$ is compared to the spectrum of all other individual transitions $\gamma_i(\tau)$ through $$\rho_{i,j} = \frac{\sum_k y_i(k) y_j(k)}{\sqrt{\sum_k |y_i(k)|^2 \sum_k |y_j(k)|^2}}$$

where the sum over k denotes the sum over the discrete samples of the photodetected and digitized spectra over a full time-lens aperture. Regarding the $n^{th}$ bit as known, a guessed bit sequence can be built by using the transitions to the n+1 bit. By comparing to the PRBS from the IQ recordings, errors are recorded and corrected back to the original bit sequence to continue this process. The number of times the guessed signal deviates from the true signal divided by the total number of bits results in the BER. FIG. 8C for QAM4 and FIG. 8F for QAM8 are two plots comparing the $\rho$ value of one pilot sequence to a different pilot of the same bit sequence. In these graphs, the value of $\rho$ depicted is the average calculated value comparing multiple identical transitions from two similar pilot tones that each iteratively scan through all bit pairs. Comparing the map of transition correlations in FIG. 8C to FIG. 8F, the much smaller differences between the two largest $\rho$ values (two best guesses) demonstrate the reason behind the non-zero recorded BER for the QAM8 signal, while the QAM4 encountered no errors.

Annex 1—Theoretical Derivation and Experimental Setup Details 1.1 Basic Theoretical Analysis of the Operation Principle The needed imaging conditions such that the resulting action on each segment of the signal under test (SUT) extending over a prescribed temporal aperture TL is the time-mapped Fourier transform limited in domain to this aperture are derived in this section.

Figures 9A, 9B:
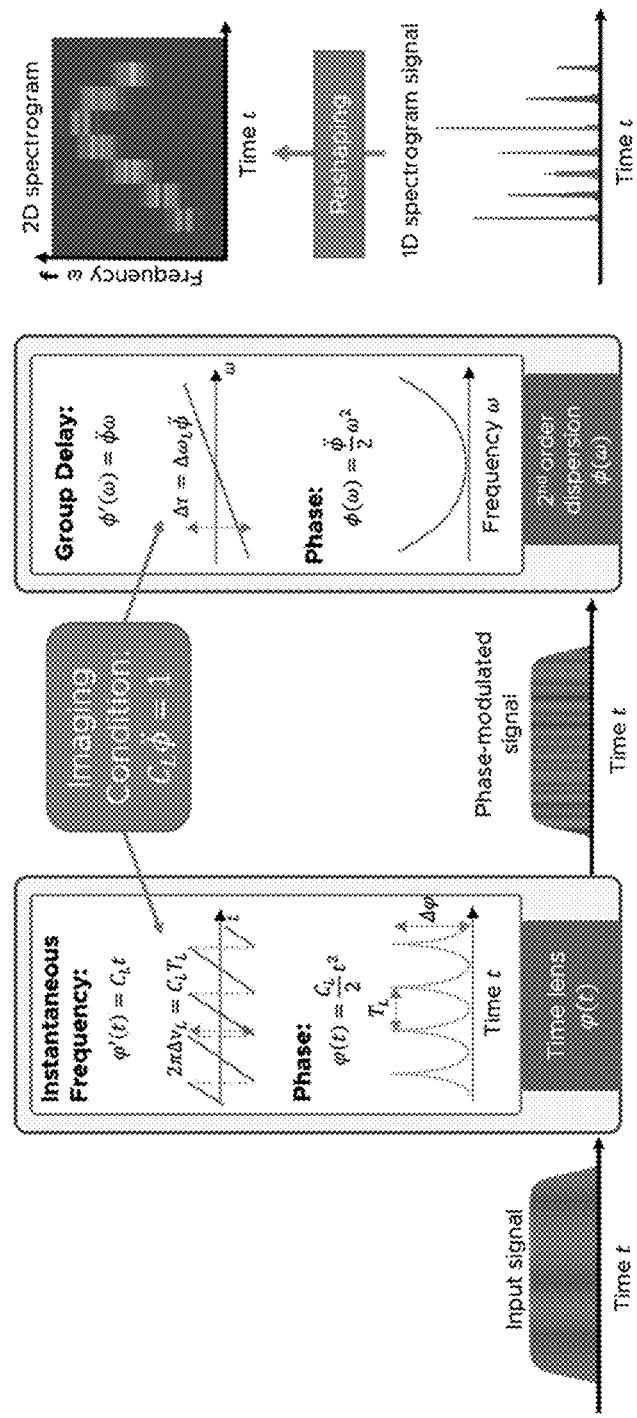

FIG. 9A depict detailed time-lens spectrogram concept. The principle on a SUT with a varying instantaneous frequency, as shown by the colour gradient, is illustrated in FIG. 9A. The first step consists of a periodic modulation of the temporal phase following a quadratic profile $\varphi(t)$, which corresponds to a linear modulation of the instantaneous frequency $\varphi'(t)$ (derivative of the temporal phase) over a total bandwidth $\Delta\omega_L = 2\pi\Delta\pi$, as shown in FIG. 9A. This leads to an additional linear variation of the instantaneous frequency, which periodically repeats with a period $T_L$, effectively implementing a gapless time-lens array, as illustrated in FIG. 9A. FIG. 9A illustrates the energy being then redistributed using a second-order dispersive device, which imposes a linear variation of the group delay vs frequency along the full modulated signal bandwidth. By satisfying the imaging condition $C_L \ddot{\phi}=1$, there is obtained the spectrogram signal directly mapped along the time domain, shown in FIG. 9B. This 1-dimensional signal can then be numerically reshaped into a 2-dimensional representation on a computer for viewing purposes, shown in FIG. 9B. The fundamental principle can be understood by considering two frequency components separated by $\Delta\omega_0$, as depicted in FIG. 9C. The temporal phase modulation will lead to a spectral broadening and a succession of chirped regions, depicted in FIG. 9D. The imaging condition $1=C_L\ddot{\phi}$ ensures that the subsequent dispersive propagation will fully compensate for the chirp from the temporal phase modulation, effectively realigning the frequency components into a short pulse of duration $\sim 1/v_L$ as shown in FIG. 9E. The two frequency components will thus be frequency-to-time mapped, leading to a pulse separation proportional to their frequency spacing, $\Delta t_0 = \Delta\omega_0 \ddot{\phi}$. By imposing that the total bandwidth of the signal is lower than the time-lens bandwidth, $\Delta\omega_0 < \Delta\omega_L$, this ensures that the spectrum is mapped at most to the temporal extent of a single lens aperture $T_L$.

Begin with a temporal phase transformation of the form:

$$A_{TL}(\tau) = A_{in}(\tau) e^{i\varphi(\tau)} \qquad \text{Eq. 1}$$

where $A_{in}(\tau)$ denotes the complex-field amplitude of the SUT depicted in FIG. 9A, with a time $\tau$ centered about the quadratic phase modulation implemented by the time lens process, constrained to a total time duration of $T_L$ (temporal aperture). Specifically, the quadratic phase from the time lens is defined by $\varphi(t) = C_L \tau^2/2$, with $-T_L/2 \leq \tau \leq T_L/2$, where $C_L$ quantifies the strength of the time lens. This leads to a total phase excursion $\Delta\varphi = |C_L| T_L^2/8$ over the lens aperture corresponding to a total modulation bandwidth of $2\pi\Delta v_L$ $\Delta\omega_L = |C_L| T_L$, as shown in FIG. 9A. The subsequent transformation is dispersive propagation, described by a phase function over angular frequency $\omega$ corresponding to $\phi(\omega) = \ddot{\phi}\omega^2/2$, where $\ddot{\phi}$ is the second-order group velocity dispersion (GVD) parameter. The resulting waveform in the temporal domain may be found through the convolution integral, defined as:

$$\tilde{A}(\tau) = \int A_{TL}(\tau') \cdot G(\tau - \tau') d\tau'' \qquad \text{Eq. 2}$$

Where $$G(\tau) = \int e^{i\phi(\omega)} e^{i\omega t} d\omega = \int e^{i\frac{\ddot{\phi}}{2}\omega^2} e^{i\omega t} dt = (i2\pi\ddot{\phi})^{-\frac{1}{2}} e^{-i\frac{1}{2\ddot{\phi}}\tau^2}$$

is the temporal impulse response of the dispersive line, given by the inverse Fourier transform of the chromatic dispersion operator, and $A_{TL}(\tau)$ is the waveform after the time lens. Inserting Eq. 1 into Eq. 2, the following equation is obtained:

$$A_{out}(L, \tau) = \frac{1}{\sqrt{i2\pi\ddot{\phi}}} \int A_{in}(\tau') \cdot e^{i\frac{C_L}{2}\tau'^2} \cdot e^{-i\frac{(\tau-\tau')^2}{2\ddot{\phi}}} d\tau' = $$

$$\frac{e^{-i\frac{\tau^2}{2\ddot{\phi}}}}{\sqrt{i2\pi\ddot{\phi}}} \int A_{in}(\tau') \cdot e^{i\left(\frac{C_L}{2} - \frac{1}{2\ddot{\phi}}\right)\tau'^2} \cdot e^{i\frac{(2\tau\tau')}{2\ddot{\phi}}} \qquad \text{Eq. 3}$$

The middle term can be removed if the following condition is satisfied:

$$C_L = 1/\ddot{\phi} \qquad \text{Eq. 4}$$

which corresponds to the main condition given above. This results in a mathematical relation equivalent to the Fourier transform, $$A_{out}(\tau) = \frac{e^{-i\frac{\tau^2}{2\ddot{\phi}}}}{\sqrt{i2\pi\ddot{\phi}}} \int A_{in}(\tau') \cdot e^{i\frac{(2\tau\tau')}{2\ddot{\phi}}} d\tau' \qquad \text{Eq. 5}$$

with an irrelevant quadratic phase pre-factor that will be eliminated when the optical field is detected by a square-law detector, e.g., using aa photodiode. It can be observed that in the calculation of the Fourier transform there is also a frequency-to-time scaling factor inversely proportional to dispersion. To show the explicit form of the Fourier transform (denoted by the operator $\mathcal{F}\{\cdot\}$), the time-mapped natural frequency $v_t = -\tau/(2\pi\ddot{\phi})$ is associated, leading to the form:

$$A_{out}(\tau = -v_t 2\pi\ddot{\phi}) \propto \int A_{in}(\tau') \cdot e^{-i2\pi v_t \tau'} d\tau' = \mathcal{F}\{A_{in}(\tau)\} \qquad \text{Eq. 6}$$

As shown in FIG. 9A, it should be noted that the quadratic phase modulation of the time lens implies an instantaneous frequency that changes linearly along the time domain, as $\omega_i(t) = C_L \tau$. As a result, the time lens process covers a full natural frequency bandwidth over the time lens aperture $T_L$ given by the following expression:

$$\Delta v_L = \frac{|C_L| T_L}{2\pi} = \frac{T_L}{2\pi|\ddot{\phi}|} \qquad \text{Eq. 7}$$

where the condition defined by Eq. 3 has also been applied. As depicted in FIGS. 9C-9E, the Fourier transform of the analysed signal segment extends over a maximum frequency range within the SUT bandwidth, $\Delta\omega_0$. Considering the frequency-to-time mapping law defined above, this implies that the obtained Fourier transform will be mapped along the time domain at most over a time duration $\Delta t_0 = |\ddot{\phi}|\Delta\omega_0$.

In the present time-lens spectrogram (TLS), neighbouring segments of the SUT are thus sequentially Fourier transformed and consecutively mapped along the time domain, with a temporal spacing between consecutive time-mapped spectra dictated by the aperture $T_L$. The time-mapped spectrogram can then be captured by direct intensity (square-law) detection of the processed optical signal (after dispersive propagation). To ensure no time overlapping among consecutive mapped spectra, each of these spectra should be limited to a time duration of $T_L$. This imposes a limitation to the SUT frequency bandwidth, as $|\ddot{\phi}|\Delta\omega < T_L$, such that the input signal bandwidth is just limited by the time-lens bandwidth (see Eq. 6). Hence, a higher operation instantaneous bandwidth can be achieved using a larger time-lens bandwidth.

A practical time lens is typically constrained regarding the maximum phase modulation excursion it can provide $(\Delta\varphi_{max})$. As defined above, this imposes a limitation on the maximum frequency excursion, or bandwidth, of the time lens:

$$2\pi\Delta v_L = |C_L| T_L < \frac{8\Delta\varphi_{max}}{T_L} \qquad \text{Eq. 8}$$

Thus, for a fixed maximum phase modulation excursion, the time lens bandwidth can be increased by reducing the time lens aperture only. As discussed above, the time lens aperture determines the time resolution of the obtained spectrogram representation, such that a sharper time resolution is achieved, given that the time-lens aperture is shortened. A shorter time resolution necessarily implies a poorer frequency resolution as the time and frequency resolutions of a spectrogram distribution are inversely related, as per the uncertainty principle of the Fourier transform.

Experimental Setup

Figure 10A:
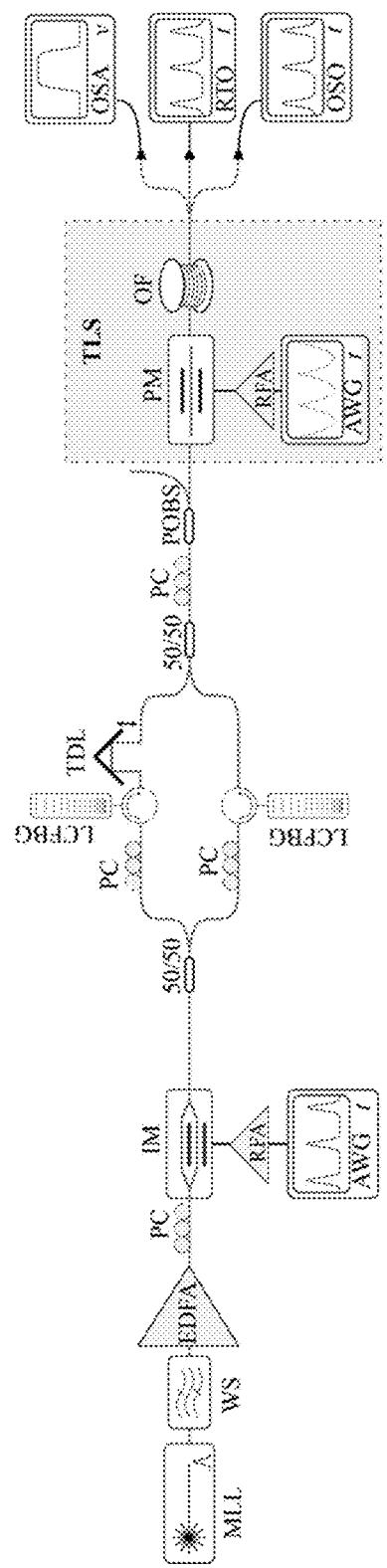
FIGS. 10A-10C each illustrate a respective time-lens spectrogram set-up, in accordance with some embodiments.
Figure 10B:
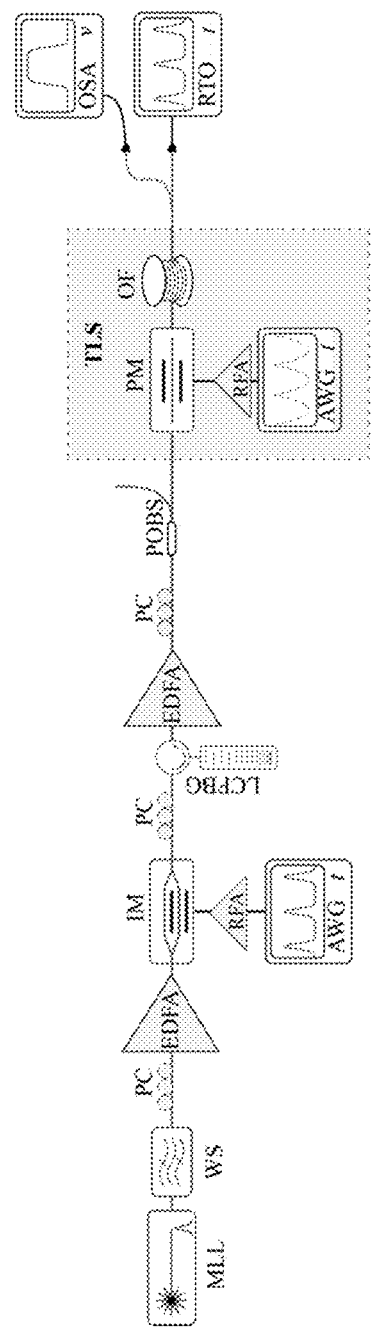
Figure 10C:
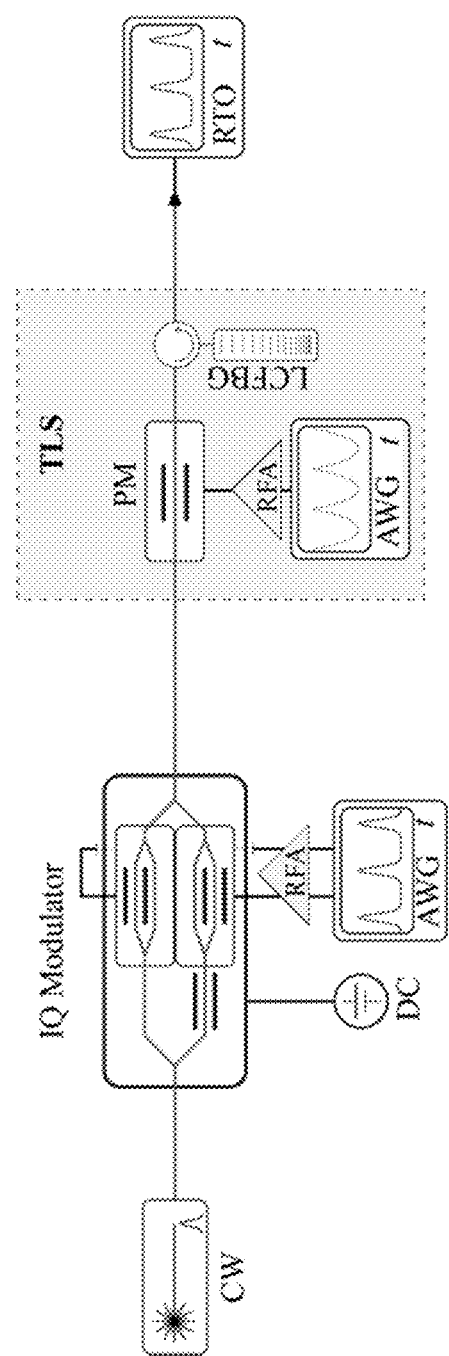

Detailed schematics of the experimental setups employed in this study are depicted in FIGS. 10A-10C.

FIGS. 10A-10C illustrate the experimental setup used for the experiments reported in FIGS. 6A and 6B and 7B. FIG. 10B illustrates the experimental setup for the experiments reported in FIG. 7A. FIG. 10C illustrates the experimental setup for the experiments reported in FIGS. 8A-8F. The definitions of the acronyms used in FIGS. 10A-10C are as follows. MLL: Mode-Locked Laser, WS: WaveShaper, EDFA: Erbium-Doped Fibre Amplifier, PC: Polarization Controller, IM: Intensity Modulator, RFA: RF Amplifier, AWG: Arbitrary Waveform Generator, LCFBG: Linearly-Chirped Fibre Bragg Grating, TDL: Tuneable Delay Line, POBS: POlarization Beam Splitter, TLS: Time-Lens Spectrogram, PM: Phase Modulator, OF: Optical Fibre (either Dispersion Compensating Fibre, DCF, or Single Mode Fibre, SMF), OSA: Optical Spectrum Analyzer, RTO: Real-Time Oscilloscope, OSO: Optical Sampling Oscilloscope, CW: Continuous Wave, DC: Direct Current.

FIGS. 11A-11D depict LCFBG characterization, i.e., spectral phase and amplitude response of the LCFBGs used in the reported experiments. The amplitude responses were measured with an OSA while the phase responses were measured with a LUNA Optical Vector Analyzer (OVA) 5000™. The values for the second-order dispersive parameter $\ddot{\phi}$ were taken as the mean value over the bandwidth, while the third-order dispersive parameters $\dddot{\phi}_1$ were obtained by performing a linear fit over the angular frequencies, yielding (a) $\ddot{\phi}=-2{,}521$ ps$^2$, $\dddot{\phi}_1=15.8$ ps$^3$, (b) $\ddot{\phi}=-2{,}561$ ps$^2$, $\dddot{\phi}_1=15.4$ ps$^3$, (c) $\ddot{\phi}=2{,}561$ ps$^2$, $\dddot{\phi}_1=-51.7$ ps$^3$, and (d) $\ddot{\phi}=12{,}758$ ps$^2$, $\dddot{\phi}=-15.5$ ps$^3$.

Figure 12:
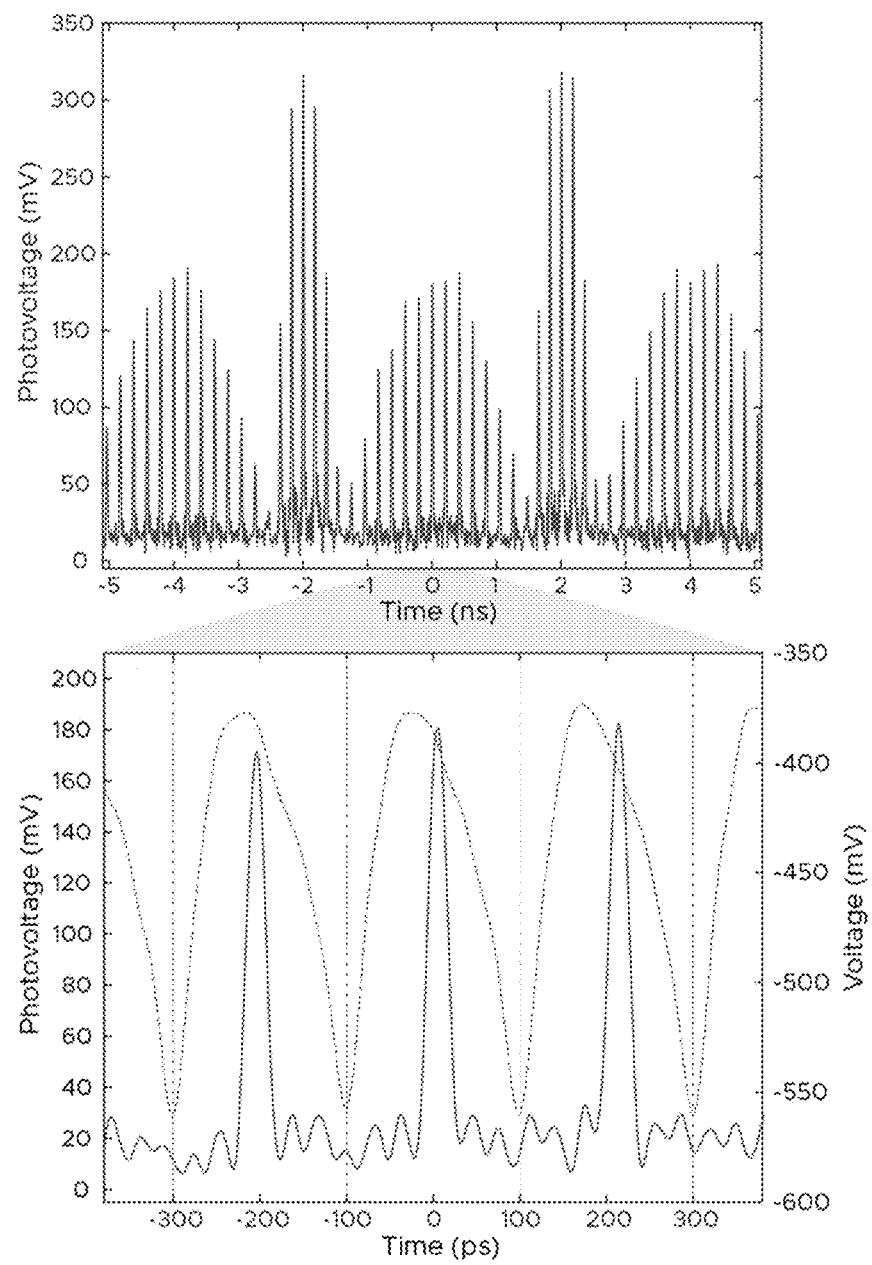
FIG. 12 illustrates an exemplary measured spectrogram trace.

FIG. 12 depicts measured spectrogram trace. FIG. 12 illustrates a temporal signal measured for the results shown in FIG. 6A, with a zoomed-in portion shown in FIG. 12, showing the recorded trace by the photodiode in dark blue as well as the measured electrical time-lens signal employed for driving the electro-optic modulator in dashed blue. It should be noted that the asymmetry in the time-lens modulation profile was specifically designed to compensate for the response of the RF amplifier. The pulse width of the spectrogram trace approximately corresponds to the spectral resolution following the frequency-to-time mapping law. The $\ddot{\phi}_1$ region has pulse widths with full-width at half maximum (FWHM) of ~26.49 ps while the $\ddot{\phi}_2$ region has pulse widths of ~24.36 ps, corresponding to frequency widths of ~7.07 GHz and ~6.5 GHz, respectively, following the corresponding frequency-to-time mapping law. These values closely correspond to the expected ones of 6.26 GHz and 5.57 GHz, respectively, as described in detail in the Methods section and depicted as the overlay of FIG. 6A. The main reason for the larger observed width may be due to limited resolution bandwidth of the RTO.

Annex 2—Demonstration of Gapless Operation

Figure 13A:
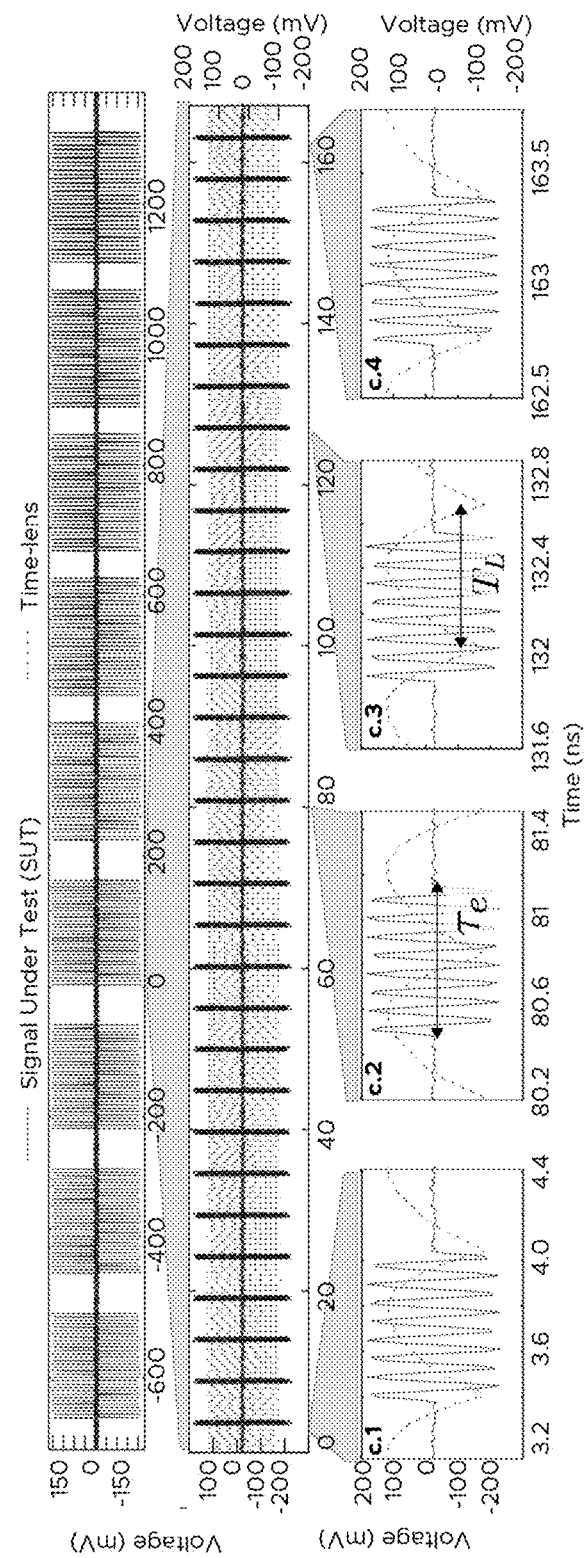
FIGS. 13A and 13B illustrate a gapless operation experiment principle, in accordance with an embodiment.
Figure 13B:
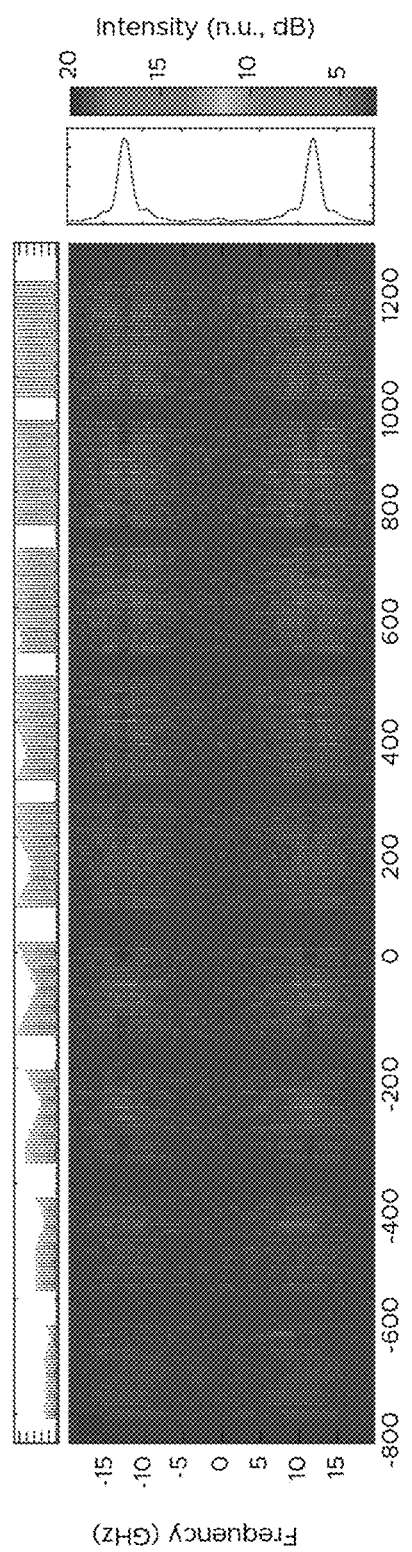

FIGS. 13A and 13B depict the gapless operation experiment principle. As illustrated FIG. 13A, a specific signal is designed to verify the gapless operation of the time-lens spectrogram (TLS), green trace, which consists of a series of bursts of varying duration and changing time-of-arrival with respect to the time lens, shown in dashed blue. As illustrated in FIG. 13B, a detailed analysis of the obtained spectrogram is carried out to demonstrate that the entire event energy is preserved, regardless of the time-of-arrival of the event.

The genuine gapless operation of the proposed scheme is demonstrated by generating a signal under test (SUT) consisting of 9 bursts, each containing 32 fast events on a 12.2 GHz carrier (FIG. 13A), generated by carving a continuous wave (CW) laser using an electro-optic intensity modulator (IM) biased at null-point. The spectrogram for this experiment was setup with a time-lens aperture $T_L=640$ ps, with a dispersion of $\ddot{\phi}\approx 2{,}521$ ps$^2$, provided by an LCFBG, enabling a total operation bandwidth of 39.4 GHz. The bursts contain multiple events each with a constant duration $\tau_e$, varying from $0.25\times T_L=160$ ps up to $2.25\times T_L=1.44$ ns, in increments of 160 ps (for a total of 9 bursts). A close-up of a burst showing the 32 fast events of duration $\tau_e=T_L$ is shown in FIG. 13A. Each event is shifted with respect to the lens array such that the first event is aligned with the centre of the lens (the "ideal scenario"), while some are aligned with the edges of two adjacent lenses (the "worst-case scenario"), until returning to the initial position, as detailed in the zoomed-in regions in FIG. 13A. The characteristics of this SUT allows us to rigorously investigate both the effect of event duration and relative position within the lenses on the intensity of the obtained spectrogram. As described below, when an event occurs within a single lens (e.g., FIG. 13A), the entire energy from that event is constrained to a single output spectrum, resulting in the maximum peak amplitude. When it is located on the edges of adjacent times lenses (e.g., FIG. 13A), the energy is split between those two output spectra, resulting in a decrease in peak energy. However, for these cases where the event occurs on the edge of adjacent lenses, the sum of these peaks corresponds to approximatively the same value as when the event occurs in the centre since the spectrogram operates in a lossless fashion (except for the practical insertion loss).

Figure 14A:
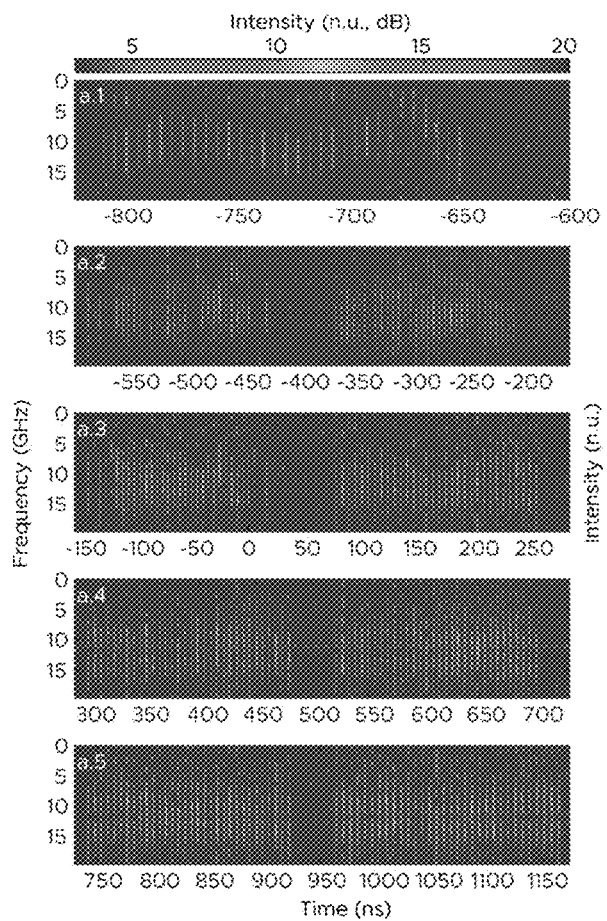
FIGS. 14A-14C illustrate gapless operation experiment details, in accordance with an embodiment.
Figure 14B:
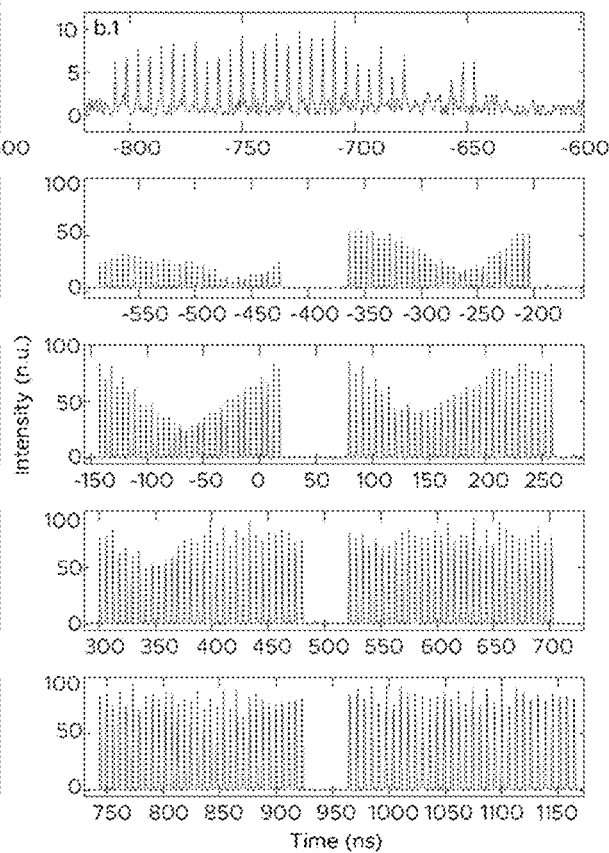
Figure 14C:
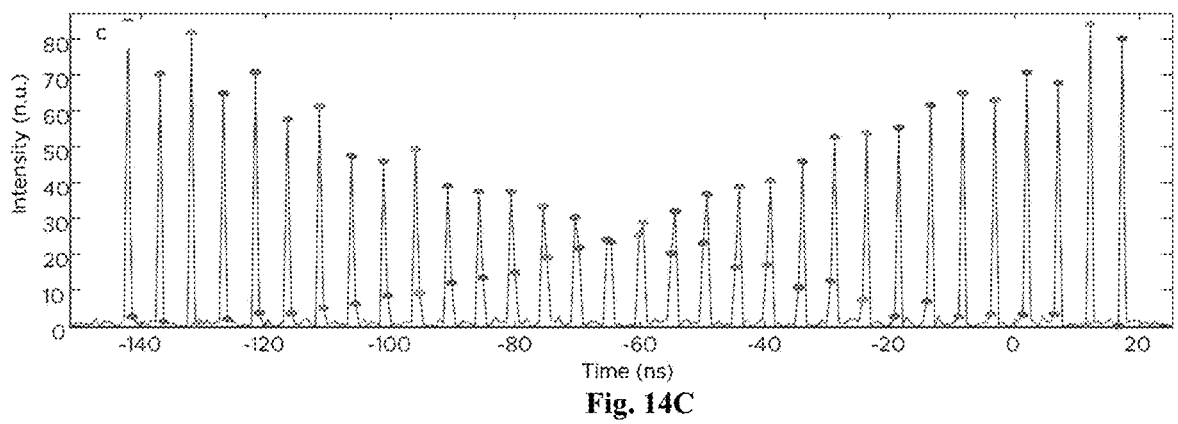

FIGS. 14A-14C depict the gapless operation experiment details. FIG. 14A illustrates the obtained spectrogram, showing zoomed-in regions from FIG. 13B. For the gapless operation study, only the points occurring within the dotted red lines were considered, which are points within 1.6 GHz (i.e., the nominal frequency resolution of the spectrogram) of the carrier signal, at 12.2 GHz. FIG. 14B illustrates temporal marginals for the selected regions, taken as the mean value within the frequency region. In FIG. 14C, only the points shown by the circles, corresponding to the location where a frequency component is expected, depending on the relative shift of the time-lens array and the event, are considered. This plot is a zoomed shows a zoomed-in version of the results with the event duration equal to the time-lens aperture, $\tau_e=T_L=640$ ps.

The resulting spectrogram from scanning through all events is shown in FIG. 13B. Note that the intensities are shifted and normalized by the DC value and standard deviation of the background noise of the photodetected spectrogram signal, respectively, and expressed in logarithmic units (i.e., the intensity values correspond to the signal-to-noise ratio of that event, expressed in decibels). FIG. 13B shows the temporal and frequency marginals (i.e., projections) on a linear scale.

An analysis of the intensity of the recovered events is carried out to demonstrate that the spectrogram can indeed operate in a gapless fashion down to events with a temporal duration of only a quarter of the time-lens aperture, ~$T_L/4$. To this end, the resulting spectrogram is analysed by finding the temporal marginal as the peak value of the spectrogram near the expected frequency location of the tone. In particular, the peak intensity of each spectrum, restricted to the frequency components within a spectral region of ~1.6 GHz (corresponding to the nominal frequency resolution of the spectrogram), centred at the peak of the tone (i.e., 12.2 GHz), depicted by the red dashed lines in each of the subplots in FIG. 14A is measured. These subplots correspond to a zoomed-in representation of the measured spectrogram for each burst. Restricting the analysis to this frequency range effectively ensures that the spectrogram is returning the correct time-frequency information, regardless of the event duration and time of arrival. Indeed, one may notice that as the event gets shorter, there is an interference pattern that arises depending on the location of the event with respect to the lens array. The resulting marginals for each spectrogram plots in FIG. 14A are correspondingly shown in each subplot of FIG. 14B The effect of an event located on the edge of a lens can be clearly seen on the 4$^{th}$ burst where $\tau_e = T_L$ (i.e., first burst near −100 ns in FIG. FIG. 14B, also depicted in FIG. FIG. 14C for clarity). Then the temporal points where each event is expected to be depending on its duration are determined, forming 32 groups of points shown by the coloured circles. For this case, since the event duration is given by $\tau_e = T_L$, each individual event can be in at most 2 adjacent time-lenses, as shown by the circles in groups of two: at the beginning, the event is centred on one lens, then it is split into two lenses, and finally it is centred on the second lens. The analysis is carried out similarly for a different event duration (an event of duration $\tau_e$ covers n number of lenses corresponding to $$n = \left\lceil \frac{\tau_e}{T_L} \right\rceil + 1,$$

where $\left\lceil \frac{a}{b} \right\rceil$ indicates a rounding up of the operand $\frac{a}{b}$).

where [a/b] indicates a rounding up of the operand a/b).

Figure 15:
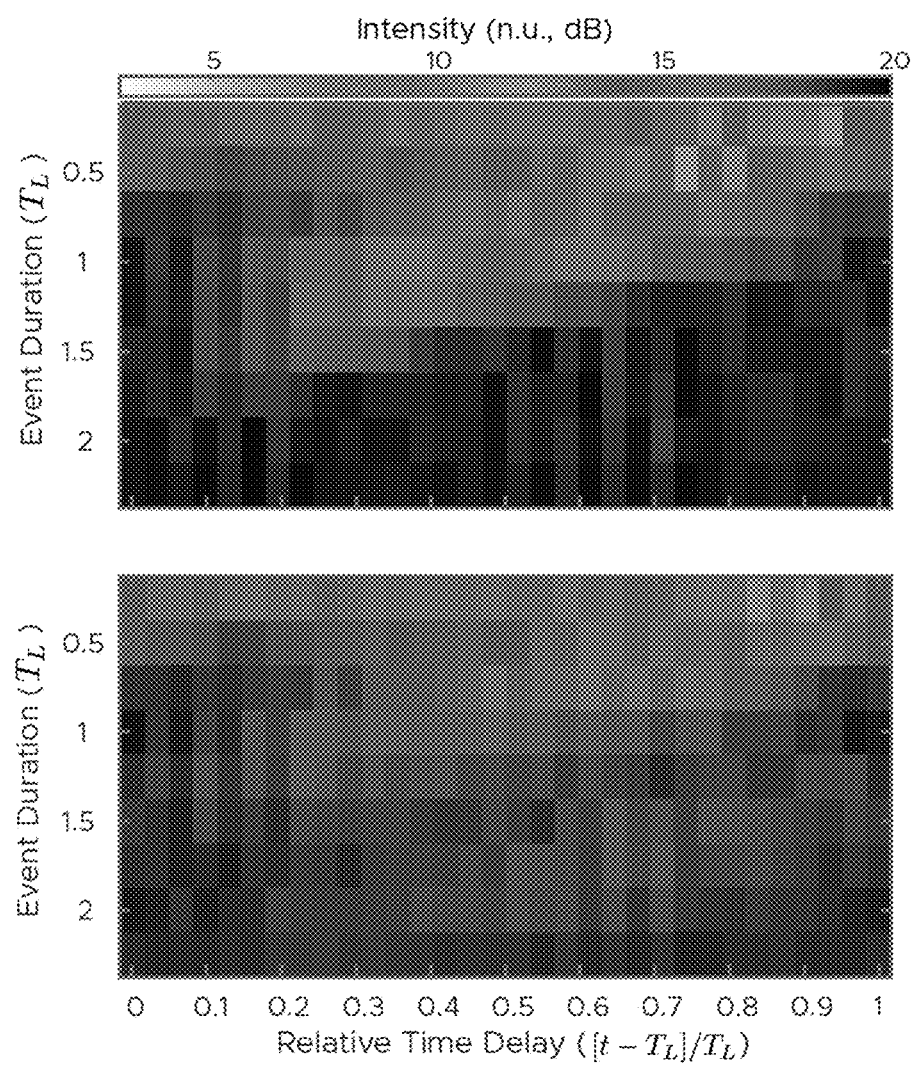
FIG. 15 illustrates exemplary results for a gapless operation experiment.

FIG. 15 depicts the results for the gapless operation experiment. In FIG. 15, the peak of the marginals is found for each event (i.e., corresponding to a group of the points labelled by the circles in FIG. 14C), and an expected decrease of the peak power is found as the event becomes shorter than a time lens when the event occurs on the edges of two adjacent time lenses. In FIG. 15, if the sum of the peaks is found where the event is detected for adjacent time lenses, the energy is relatively constant, regardless of the event duration or time of arrival, indicating that the spectrogram operates in a truly gapless fashion.

First the visibility of each event is obtained by simply finding the peak value for each group of lenses (i.e., circles of the same colour in FIG. 14C), and these values are plotted against both the event duration and the relative shift between the event and the lens, shown in FIG. 15. For events shorter than a time lens, the intensity is normalized by their duration to compensate for their reduced maximum relative energy when the event is exactly centred within a lens. The decrease in the peak power can be seen as the event becomes shorter than $T_L$, with the shifting minimum point corresponding to the time at which the event is centred on the edge. This decrease in power is due to the fact that the event energy of the short event is split into two time lenses. If instead of taking the peak value, the sum of the peaks over which the event is spread (i.e., the different lenses over which the event is overlapping) is taken, the intensity can be seen to remain relatively constant even as the event duration approaches a quarter of the time-lens aperture (i.e., corresponding to the top rows of FIG. 8A). This is due to the fact that the entire energy of the event is maintained to produce the output spectrogram, as expected for a passive energy redistribution scheme. Here, the sum of the energy within adjacent time-lenses is normalized by the duration of the event to allow for a comparison between the different event durations. Thus, this comprehensive experimental analysis demonstrates that the spectrogram indeed operates in a truly gapless fashion, with an expected deterioration as the event becomes significantly shorter than the temporal resolution given by the time-lens aperture.

Annex 3—Conditions for Unwrapping

Figure 16A:
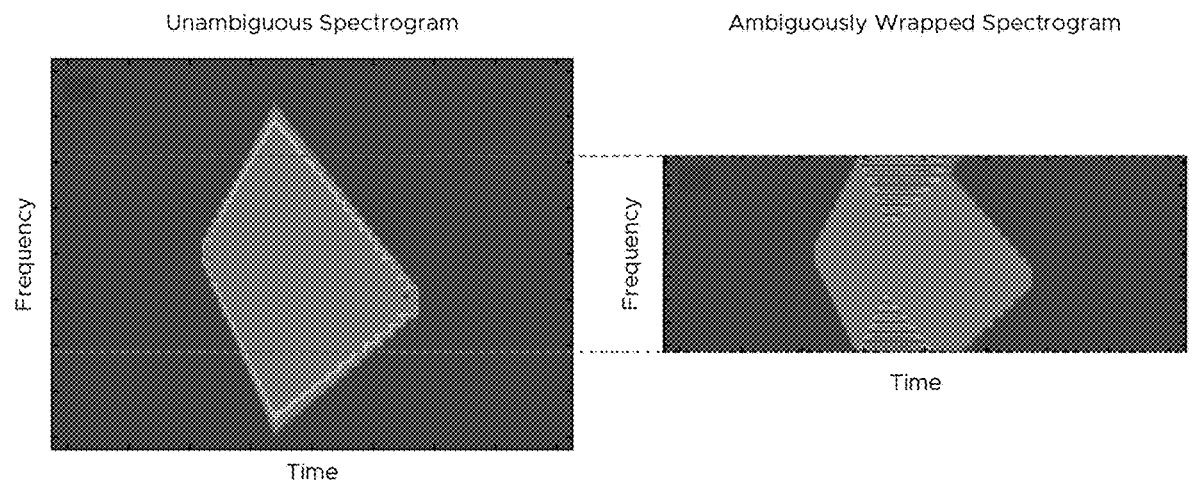
FIGS. 16A and 16B illustrate conditions for unambiguous unwrapping of broadband signals, in accordance with an embodiment.
Figure 16B:
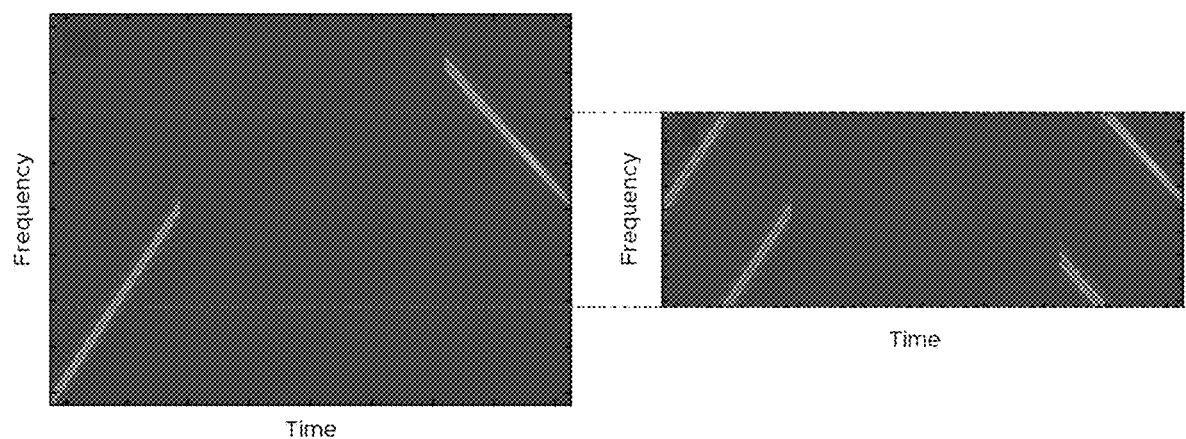

FIGS. 16A and 16B depict the conditions for unambiguous unwrapping of broadband signals. Ambiguity may arise for unwrapping the spectrogram in certain cases. On the left, there is shown the obtained spectrogram of different signals using a large operation bandwidth, and on the right, the corresponding wrapped spectrogram when the same signals are analysed with a lower operation bandwidth. Ambiguity may arise if the spectrogram is multi-valued for a given time-frequency region after wrapping as in FIG. 16A, or if the signal has jumps in time and/or frequency as in FIG. 16A.

In most cases, the unwrapping technique employed for recovering the broadband waveforms from FIGS. 7A-7F will unambiguously recover the signal under test, However, if the signal is a broadband signal such as the one depicted in FIG. 16A, the wrapped spectrogram may be multi-valued in a given time-frequency region, which leads to some ambiguity that may prevent recovering the full time-frequency representation. It should be noted note that this condition may be relaxed by analysing the interference pattern visible in FIG. 16A. Ambiguity may also arise if the signal has jumps in time and/or frequency as shown by the example in FIG. 16B, in which the incorrect frequency separation between the two chirps after wrapping is recovered, as illustrated in FIG. 16B.

What is claimed is:

1. A system for generating a spectrogram signal representative of a spectrogram of an initial signal, the system comprising:
    a temporal phase modulator for receiving the initial signal and quadratically modulating a temporal phase of the initial signal in a periodic series of consecutive quadratic time lenses in order to obtain a temporal phase modulated signal;
    a spectral phase modulator for quadratically modulating a spectral phase of the temporal phase modulated signal to obtain a given signal representative of a series of consecutive spectra; and
    a sensor for detecting the given signal in a temporal domain in order to obtained a sensed signal and outputting the sensed signal, the sensed signal being representative of the spectrogram of the initial signal;
    wherein the initial signal is an optical signal, and the temporal phase modulator is operable to quadratically modulate the temporal phase of the continuous signal in a series of consecutive discretized time lenses.

2. The system of claim 1, wherein the temporal phase modulator comprises one of an electro-optic phase modulator, a cross-phase modulator (XPM) and a four wave mixer.

3. The system of claim 1, wherein the spectral phase modulator comprises one of an optical waveguide, a Linearly chirped fibre Bragg Gratings (LCFBG), a Bragg mirror, a pulse shaper, an integrated phase filter and a Talbot array illuminator.

4. The system of claim 1, wherein the temporal phase modulator comprises a first Talbot array illuminator.

5. The system of claim 4, wherein the spectral phase modulator comprises one of an optical waveguide, a Linearly chirped fibre Bragg Gratings (LCFBG), a Bragg mirror, a pulse shaper, an integrated phase filter and a second Talbot array illuminator.

6. The system of claim 1, further comprising a processing unit for generating the spectrogram of the initial signal based on the sensed signal.

7. The system of claim 1, wherein the initial signal comprises one of an acoustic signal, a plasmonic signal, a quantum wave signal, a microwave signal and an X-ray signal.

8. A system for generating a spectrogram signal representative of a spectrogram of an initial signal, the system comprising:
a temporal phase modulator for receiving the initial signal and quadratically modulating a temporal phase of the initial signal in a periodic series of consecutive quadratic time lenses in order to obtain a temporal phase modulated signal;
a spectral phase modulator for quadratically modulating a spectral phase of the temporal phase modulated signal to obtain a given signal representative of a series of consecutive spectra; and
a sensor for detecting the given signal in a temporal domain in order to obtained a sensed signal and outputting the sensed signal, the sensed signal being representative of the spectrogram of the initial signal;
wherein one of:
a temporal modulation applied by the temporal phase modulator forms a first approximation of a quadratic temporal modulation; and
a spectral modulation applied by the spectral phase modulator corresponds to forms a second approximation of a quadratic phase modulation.

9. A method for generating a spectrogram signal representative of a spectrogram of an initial signal, the system comprising:
receiving the initial signal and quadratically modulating a temporal phase of the initial signal in a periodic series of consecutive quadratic time lenses, thereby obtaining a temporal phase modulated signal;
quadratically modulating a spectral phase of the temporal phase modulated signal, thereby obtaining a given signal representative of a series of consecutive spectra; and
detecting the given signal in a temporal domain, thereby obtaining a sensed signal, and outputting the sensed signal, the sensed signal being representative of the spectrogram of the initial signal.

10. The method of claim 9, wherein the initial signal is an optical signal.

11. The method of claim 10, wherein said quadratically modulating the temporal phase of the initial signal comprises propagating the initial signal into one of an electro-optic phase modulator, a cross-phase modulator (XPM) and a four wave mixer.

12. The method of claim 10, wherein said quadratically modulating the spectral phase of the comprises propagating the temporal phase modulated signal into one of an optical waveguide, a Linearly chirped fibre Bragg Gratings (LCFBG), a Bragg mirror, a pulse shaper, an integrated phase filter and a Talbot array illuminator.

13. The method of claim 10, wherein said quadratically modulating the temporal phase of the initial signal comprises quadratically modulating the temporal phase of the continuous signal in a series of consecutive discretized time lenses.

14. The method of claim 13, wherein said quadratically modulating the temporal phase of the initial signal comprises propagating the initial signal into a first Talbot array illuminator.

15. The method of claim 14, wherein said quadratically modulating the spectral phase of the comprises propagating the temporal phase modulated signal into one of an optical waveguide, a Linearly chirped fibre Bragg Gratings (LCFBG), a Bragg mirror, a pulse shaper, an integrated phase filter and a second Talbot array illuminator.

16. The method of claim 9, further comprising generating the spectrogram of the initial signal based on the sensed signal.

17. The method of claim 9, wherein the initial signal comprises one of an acoustic signal, a plasmonic signal, a quantum wave signal, a microwave signal and an X-ray signal.

18. The method of claim 9, wherein one of:
a temporal modulation applied during said quadratically modulating the temporal phase of the initial signal corresponds to a first approximation of a quadratic temporal modulation; and
a spectral modulation applied during said quadratically modulating a spectral phase of the temporal phase modulated signal corresponds to a second approximation of a quadratic phase modulation.

* * * * *